(12) United States Patent
Mori et al.

(10) Patent No.: US 11,429,335 B2
(45) Date of Patent: Aug. 30, 2022

(54) STORAGE MEDIUM, DISPLAY CONTROL METHOD, AND DISPLAY CONTROL DEVICE

(71) Applicant: FUJITSU LIMITED, Kawasaki (JP)

(72) Inventors: Yojiro Mori, Numazu (JP); Shun Kudo, Numazu (JP); Takamasa Uramoto, Numazu (JP); Takashi Yamamoto, Shizuoka (JP); Takashi Ohata, Fujinomiya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/029,141

(22) Filed: Sep. 23, 2020

(65) Prior Publication Data

US 2021/0096803 A1 Apr. 1, 2021

(30) Foreign Application Priority Data

Sep. 30, 2019 (JP) .............................. JP2019-179103

(51) Int. Cl.
*G06F 3/14* (2006.01)
*G09G 3/20* (2006.01)

(52) U.S. Cl.
CPC .............. *G06F 3/1423* (2013.01); *G09G 3/20* (2013.01); *G09G 2360/04* (2013.01); *G09G 2370/06* (2013.01); *G09G 2370/22* (2013.01)

(58) Field of Classification Search
CPC ......... G06F 3/1423; G06F 3/147; G09G 3/20; G09G 5/14; G09G 5/001; G09G 2370/22; G09G 2370/06; G09G 2360/04
See application file for complete search history.

(56) References Cited

U.S. PATENT DOCUMENTS

2002/0078212 A1 6/2002 Besaw et al.
2007/0073902 A1 3/2007 Miyahara et al.
(Continued)

FOREIGN PATENT DOCUMENTS

JP 2000-105741 A 4/2000
JP 2007-122691 A 5/2007

OTHER PUBLICATIONS

FUJITSU Limited, FUJITSU Software NetCOBOL [online], "Web Application Construction Support" Search on Sep. 20, 2019, Internet URL: <https://www.fujitsu.com/jp/products/software/middleware/business-middleware/middleware/cobol/function/overview/meftweb.html#meftweb>, pp. 2 with Partial Translation(Total 3 pages).

*Primary Examiner* — Brent D Castiaux
(74) *Attorney, Agent, or Firm* — Fujitsu Patent Center

(57) ABSTRACT

A display control method executed by a computer, the method includes creating information that indicates settings for a new screen and storing the created information in a memory, in response to receiving a drawing request to cause a terminal device to draw the new screen, from an application that controls input and output of a screen by a sequential process that executes processes in a predetermined processing order; treating the new screen as the input target screen and transmitting drawing data to draw the new screen to the terminal device, based on the information for the new screen; and treating the new screen among screens as the input target screen and transmitting drawing data to draw the screens collectively, to the terminal device, based on information for each of the screens, when the information for the screens is stored in the memory.

11 Claims, 23 Drawing Sheets

(56) References Cited

U.S. PATENT DOCUMENTS

| | | | |
|---|---|---|---|
| 2009/0249099 A1* | 10/2009 | Saito | H04W 52/028 713/323 |
| 2011/0193806 A1* | 8/2011 | Kim | G06F 1/1641 345/1.3 |
| 2013/0263045 A1* | 10/2013 | Minematsu | G09G 5/14 715/788 |
| 2015/0355791 A1* | 12/2015 | Hidaka | G06F 3/1431 715/761 |
| 2016/0011838 A1* | 1/2016 | Ujiie | G01C 21/3688 345/520 |

* cited by examiner

FIG. 9B

| SCREEN MANAGEMENT TABLE | | | | TB1 |
|---|---|---|---|---|
| SCREEN DATA TABLE | | | | 910 |
| | INPUT/OUTPUT RECORD | | | 911 |
| | | INPUT A | 12345 | |
| | | OUTPUT B | EMPTY | |
| | | ⋮ | | |
| | SCREEN DECORATION DATA | | | 912 |
| | | SCREEN BACKGROUND COLOR | PINK | |
| | | ⋮ | | |
| SCREEN CONTROL TABLE | | | | 920 |
| | SCREEN POSITION INFORMATION DATA | | | 921 |
| | | X | 10 | |
| | | Y | 20 | |
| | | Z | 1 | |
| | MAXIMIZATION-ENABLED/ DISABLED DATA | | False | 922 |

SCREEN 1

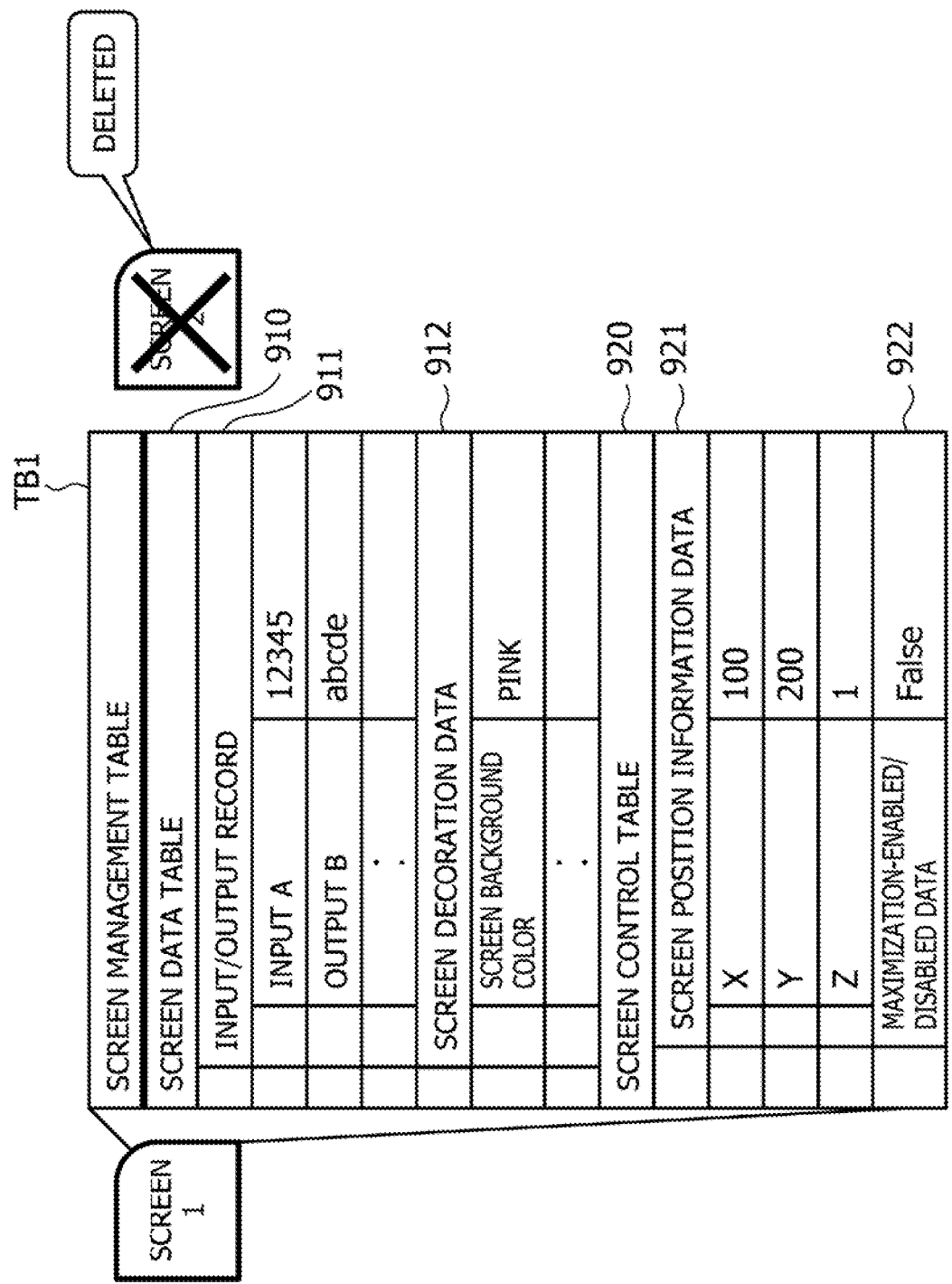

STORAGE MEDIUM, DISPLAY CONTROL METHOD, AND DISPLAY CONTROL DEVICE

CROSS-REFERENCE TO RELATED APPLICATION

This application is based upon and claims the benefit of priority of the prior Japanese Patent Application No. 2019-179103, filed on Sep. 30, 2019, the entire contents of which are incorporated herein by reference.

FIELD

The embodiments discussed herein are related to a storage medium, a display control method, and a display control device.

BACKGROUND

Conventionally, legacy assets represented by common business oriented language (COBOL) include applications that output screens by a process using file OPEN, WRITE, READ, and CLOSE commands performed in a defined simple order.

In prior art, for example, an output form of the COBOL application running on a server is printed on a printer of the server or previewed on a world wide web (WWW) browser of a personal computer (PC) client, or a printer on the PC client side is caused to print the output form through the WWW browser. For example, FUJITSU Software NetCOBOL function explanation, [online], FUJITSU LIMITED, [search on Sep. 20, 2019], Internet <URL:https://www.fujitsu.com/jp/products/Software/middleware/business-middleware/middleware/cobol/function/overview/meftweb.html#meftweb> is disclosed as related art.

SUMMARY

According to an aspect of the embodiments, a non-transitory computer-readable storage medium storing a program that causes a computer to execute a process, the process includes creating first setting information that indicates settings for a first screen and storing the created first setting information in a memory, in response to a drawing request to draw the first screen on a terminal device, the drawing request having been received from an application that controls input and output of a screen by a sequential process that executes a plurality of processes in a predetermined processing order; transmitting drawing data to draw the first screen to the terminal device based on the first setting information; creating second setting information that indicates settings for a second screen and storing the created second setting information in the memory, when a drawing request to cause the terminal device to draw the second screen is received from the application while the first screen is displayed on the terminal device; and treating the second screen among the first screen and the second screen as an input target screen and transmitting, to the terminal device, drawing data to draw both of the first screen and the second screen collectively, based on the first setting information and the second setting information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9B is an explanatory diagram (part 2) illustrating exemplary contents stored in the screen management table;
FIG. 9E is an explanatory diagram (part 5) illustrating exemplary contents stored in the screen management table.

DESCRIPTION OF EMBODIMENTS

However, in the related art, in the case of an application that controls input and output of a screen by a sequential process that executes a plurality of processes in a predetermined processing order, a plurality of screens may not be displayed at the same time. It is conceivable to amend the existing application to achieve the control of the display of a plurality of screens, but a high cost will be expected for modifying the application.

In view of the above, it is desirable to enable the display of a plurality of screens without modifying the application.

The following is a detailed description of exemplary modes of a display control program, a display control method, and a display control device according to the present embodiments, with reference to the drawings.

Embodiments

Figure 1:
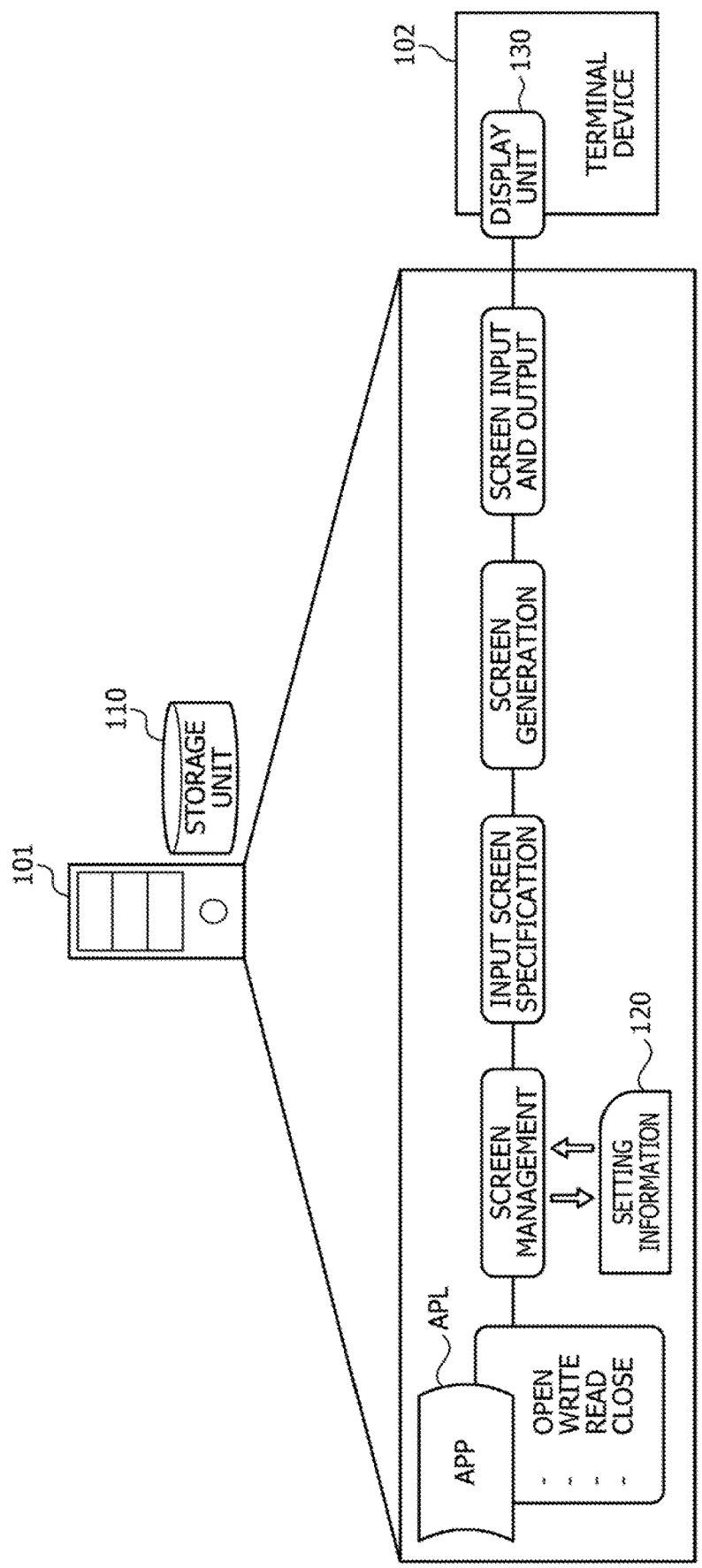
FIG. 1 is an explanatory diagram illustrating an example of a display control method according to an embodiment.

FIG. 1 is an explanatory diagram illustrating an example of a display control method according to an embodiment. In FIG. 1, a display control device 101 is a computer that causes a terminal device 102 to draw a screen in response to a drawing request from an application APL. The application APL is an application that controls input and output of a screen by a sequential process that executes a plurality of processes in a predetermined processing order. The terminal device 102 is a computer used by a user.

Here, legacy assets represented by COBOL include many applications that control input and output of a screen by a sequential process that uses file OPEN, WRITE, READ, and CLOSE commands to execute a plurality of processes in a predetermined processing order. In the following description, the application is sometimes simply referred to as "app".

For example, an existing runtime system that operates such apps performs the following processes for commands supplied from the apps. The runtime system is a software platform for operating the apps and manages a central processing unit (CPU) and a memory.

First, the existing runtime system launches a screen in response to an OPEN command (to launch a screen) from an app. Launching a screen means creating and initializing a screen to be output. Next, the existing runtime system draws the screen on the basis of information from the app, in response to a WRITE command (to draw the screen) from the app.

Next, the existing runtime system reads data input to the screen in response to a READ command (to read a re-request) from the app. Then, the existing runtime system terminates the screen in response to a CLOSE command (to terminate the screen) from the app. Terminating the screen means ending the display of the screen and deleting the information for drawing the screen. Note that, for example, the WRITE command and the READ command may be performed a plurality of times after the screen is launched (OPEN) until the screen is terminated (CLOSE).

In the following description, an app that uses file OPEN, WRITE, READ, and CLOSE to control input and output of a screen by a sequential process that executes a plurality of processes in a predetermined processing order is sometimes stated as an "RW style app".

The sequential structure of the RW style app is also applied to a client server system. For example, in the client server system, when a screen is launched in response to the OPEN command from the app, a web browser of a client draws WRITE contents and is placed in an input standby state.

Thereafter, when data is input to the screen, the web browser of the client draws WRITE contents obtained by processing and reflecting the input data, and is placed again in an input standby state. Then, the web browser of the client ends the display of the screen when the screen is terminated in response to the CLOSE command from the app.

In the RW style, communication between the app and the screen is performed between the app and a screen targeted for input. When a plurality of screens is processed in the RW style (when another screen 2 is subjected to OPEN while there is an already launched screen 1), the app communicates only with a screen targeted for input (screen 2). Therefore, the screen to be displayed is switched to a screen targeted for input (from the screen 1 to the screen 2) (switching approach).

On the other hand, a general web app has a kind of state transition structure rather than the sequential structure. The app divides processes according to a Request from the client and returns a Response. The Requests have no special order, and the app can handle a plurality of Requests even when arriving at the same time.

In transforming an RW style app into a web app, for example, there is a need to make an input while referring to the previous screen (display of a plurality of screens) or a need to perform a screen process on a variety of devices (multi-device support) for the purpose of input assistance. However, users having legacy assets often do not want to modify the app if the situation allows. For this reason, it is desired to solve these needs by diverting existing assets while maintaining the simple RW style.

Here, since a general web app has a kind of state transition structure, when a plurality of screens is displayed at the same time, the plurality of screens can be targeted for input. At this time, each screen communicates with the app independently. For this reason, when viewed from the app, the structure can be seen as if there is a plurality of communication paths.

On the other hand, since the RW approach app performs the sequential process, the screen targeted for input is only a single screen, which is the target of the READ command. For example, even when a plurality of screens is displayed, in order to perform the sequential process, the communication path with the app is supposed to be one. For this reason, in a conventional technique, when another screen appears, the previous screen is hidden and simultaneous display is avoided.

Due to such a difference in the processing techniques between the apps, it is not feasible to apply the technique of displaying a plurality of screens used for a general web app to the RW approach app.

Note that, as a technique of displaying a plurality of screens in the RW style app, it is conceivable to perform screen control on the client machine. For example, it is conceivable to perform screen control on the client side by installing a screen control mechanism represented by ActiveX (registered trademark) control on the client machine and to allow the RW style app to display a plurality of screens without any adaptation.

For a more detailed description, for example, when an app is activated in the server from the web browser of the client, the app transmits screen information to the client. Thereafter, the app communicates with the screen control mechanism of the web browser. The screen control mechanism manages OPEN and CLOSE of the screen.

For example, since the app and the browser communicate with each other when the app is activated and the app and the screen control mechanism communicate with each other after the application is activated, there are two types of communication paths. However, in this technique, the screen control mechanism is expected for each client environment.

Furthermore, there are two types of communication paths. Therefore, the display of a plurality of screens in the RW style app depends on the client environment, and it is not feasible to implement the multi-device support.

Thus, in the present embodiment, a description will be given of a display control method that enables the display of a plurality of screens without modifying the existing app APL (for example, a legacy asset in the RW style). In the description below, an exemplary process to be performed by the display control device 101 is explained.

(1) The display control device 101 creates setting information 120 for a new screen and stores the created setting information 120 in a storage unit 110 in response to receiving, from the app APL, a drawing request to cause the terminal device 102 to draw the new screen. The app APL is activated on the display control device 101 in response to a request from the terminal device 102.

For example, the app APL is an app that controls input and output of a screen by a sequential process using file OPEN, WRITE, READ, and CLOSE commands. The setting information 120 is information indicating settings for the screen, and includes, for example, information relating to contents displayed on the screen and information relating to the layout of the screen.

For example, the display control device 101 creates first setting information for a first screen and stores the created first setting information in the storage unit 110 in response to receiving, from the app APL, a drawing request to cause a display unit 130 of the terminal device 102 to draw the first screen. The display unit 130 is a functional unit for displaying a screen, and is, for example, a web browser.

Furthermore, when receiving, from the app APL, a drawing request to cause the display unit 130 to draw a second screen while the first screen is displayed on the display unit 130, the display control device 101 creates second setting information for the second screen and stores the created second setting information in the storage unit 110.

(2) When only the setting information 120 for a new screen is stored in the storage unit 110, the display control device 101 treats the new screen as an input target screen, and generates drawing data to draw the new screen, based on the setting information 120 for the new screen. Here, the input target screen is a screen that receives data input and is a screen targeted by the READ command.

Furthermore, when the setting information for each of a plurality of screens including a new screen is stored in the storage unit 110, the display control device 101 treats only the new screen among the plurality of screens as an input target screen, and generates drawing data to draw the plurality of screens collectively, based on the setting information for each of the plurality of screens.

For example, when only the first setting information is stored in the storage unit 110, the display control device 101 generates drawing data to draw the first screen, based on the first setting information. At this time, the display control device 101 generates drawing data in which the first screen is treated as the input target screen.

Furthermore, when the first setting information and the second setting information are stored in the storage unit 110, the display control device 101 generates drawing data to draw both of the first screen and the second screen collectively, based on the first setting information and the second setting information. At this time, the display control device 101 specifies, as the input target screen, the second screen, for which the drawing request has been received most recently among the first screen and the second screen. Then, the display control device 101 generates drawing data in which only the second screen is treated as the input target screen among the first screen and the second screen. For example, the display control device 101 displays both of the first screen and the second screen within one screen, and generates drawing data in which only the second screen is treated as the input target screen.

(3) The display control device 101 transmits the generated drawing data to the terminal device 102. For example, when receiving a drawing request to draw the first screen, the display control device 101 treats the first screen as the input target screen, and transmits drawing data to draw the first screen, to the terminal device 102.

Furthermore, when receiving a drawing request to draw the second screen while the first screen is displayed, the display control device 101 treats only the second screen among the first screen and the second screen as the input target screen, and transmits drawing data to draw both of the first screen and the second screen collectively, to the terminal device 102.

As described above, according to the display control device 101, even when a plurality of screens (for example, the first screen and the second screen) is launched, the plurality of screens may be drawn on the terminal device 102 in response to a request from the app APL, using the setting information indicating settings for each of the screens that have been launched. Furthermore, since it is allowed to control the setting of the screen targeted for input (for example, the second screen), the output of a plurality of screens may be implemented on one communication path between the app APL and the terminal device 102 (display unit 130).

Consequently, the display of a plurality of screens may be enabled without modifying the existing app APL (for example, a legacy asset in the RW style). In addition, since the display does not depend on the client environment, the control of a plurality of screens in legacy assets in the RW style may be implemented in a multi-device environment.

(Exemplary System Configuration of Display Control System 200)

Next, an exemplary system configuration of a display control system 200 according to the embodiment will be described. Here, a case where the display control device 101 illustrated in FIG. 1 is applied to a server 201 will be described as an example. The display control system 200 is applied to, for example, a computer system that operates legacy assets represented by COBOL.

Figure 2:
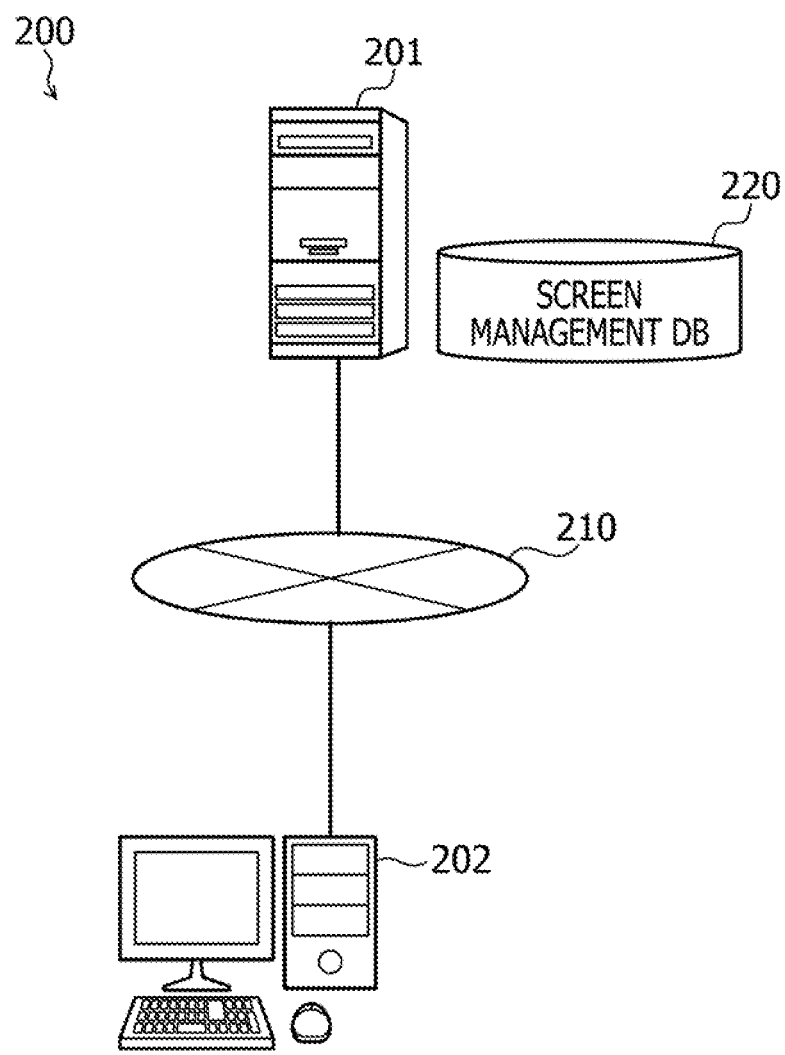
FIG. 2 is an explanatory diagram illustrating an exemplary system configuration of a display control system.

FIG. 2 is an explanatory diagram illustrating an exemplary system configuration of the display control system 200. In FIG. 2, the display control system 200 includes the server 201 and a terminal device 202. In the display control system 200, the server 201 and the terminal device 202 are connected via a wired or wireless network 210. Examples of the network 210 include a local area network (LAN), a wide area network (WAN), and the Internet.

Here, the server 201 is a computer that has a screen management database (DB) 220 and causes the terminal device 202 to draw a screen in response to a drawing request from the app APL. The screen management DB 220 stores a screen management table TB. An exemplary data structure of the screen management table TB will be described later with reference to FIG. 5. The storage unit 110 illustrated in FIG. 1 corresponds to, for example, the screen management DB 220.

The terminal device 202 is a computer used by the user, which has a browser br (see FIG. 7 described later). Examples of the terminal device 202 include a personal computer (PC), a tablet PC, and a smartphone. The terminal device 102 illustrated in FIG. 1 corresponds to, for example, the terminal device 202.

Note that, in the example in FIG. 2, only one terminal device 202 is depicted, but the number of terminal devices 202 is not limited to this example. For example, the display control system 200 includes the terminal device 202 of each user.

(Exemplary Hardware Configuration of Server 201)

Next, an exemplary hardware configuration of the server 201 (display control device 101) will be described with reference to FIG. 3.

Figure 3:
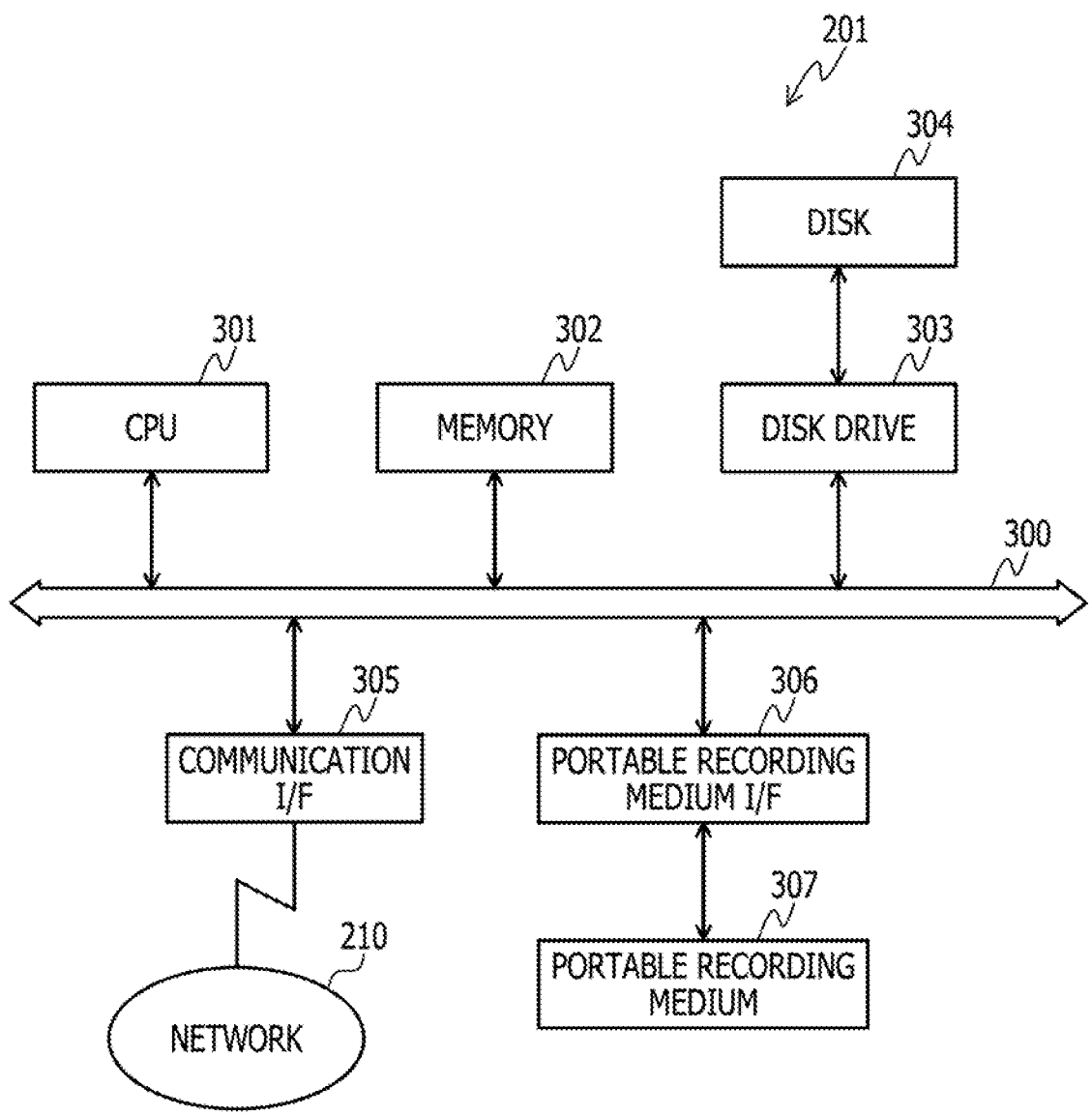
FIG. 3 is a block diagram illustrating an exemplary hardware configuration of a server.

FIG. 3 is a block diagram illustrating an exemplary hardware configuration of the server 201. In FIG. 3, the server 201 includes a CPU 301, a memory 302, a disk drive 303, a disk 304, a communication interface (I/F) 305, a portable recording medium I/F 306, and a portable recording medium 307. Furthermore, the components are connected to each other by a bus 300.

Here, the CPU 301 performs overall control of the server 201. The CPU 301 may have a plurality of cores. The memory 302 includes, for example, a read only memory (ROM), a random access memory (RAM), and a flash ROM. For example, the flash ROM stores operating system (OS) programs, the ROM stores application programs, and the RAM is used as a work area for the CPU 301. A program stored in the memory 302 is loaded into the CPU 301 to cause the CPU 301 to execute a coded process.

The disk drive 303 controls read and write of data from and into the disk 304, under the control of the CPU 301. The disk 304 stores the data written under the control of the disk drive 303. The disk 304 may be a magnetic disk, an optical disk, or the like, for example.

The communication I/F 305 is connected to the network 210 through a communication line and is connected to an external computer (for example, the terminal device 202 illustrated in FIG. 2) via the network 210. Further, the communication I/F 305 then manages an interface between the network 210 and the inside of the device, and controls input and output of data from an external computer. For example, a modem or a LAN adapter can be adopted as the communication I/F 305.

The portable recording medium I/F 306 controls read and write of data from and into the portable recording medium 307 under the control of the CPU 301. The portable recording medium 307 stores data written under the control of the portable recording medium I/F 306. Examples of the portable recording medium 307 include a compact disc (CD)-ROM, a digital versatile disk (DVD), and a universal serial bus (USB) memory.

Note that the server 201 may have, for example, a solid state drive (SSD), an input device, a display, and the like, in addition to the above-described components. Furthermore, the server 201 may not include, for example, the disk drive 303, the disk 304, the portable recording medium I/F 306, and the portable recording medium 307 among the above-described components.

(Exemplary Hardware Configuration of Terminal Device 202)

Next, an exemplary hardware configuration of the terminal device 202 will be described with reference to FIG. 4.

Figure 4:
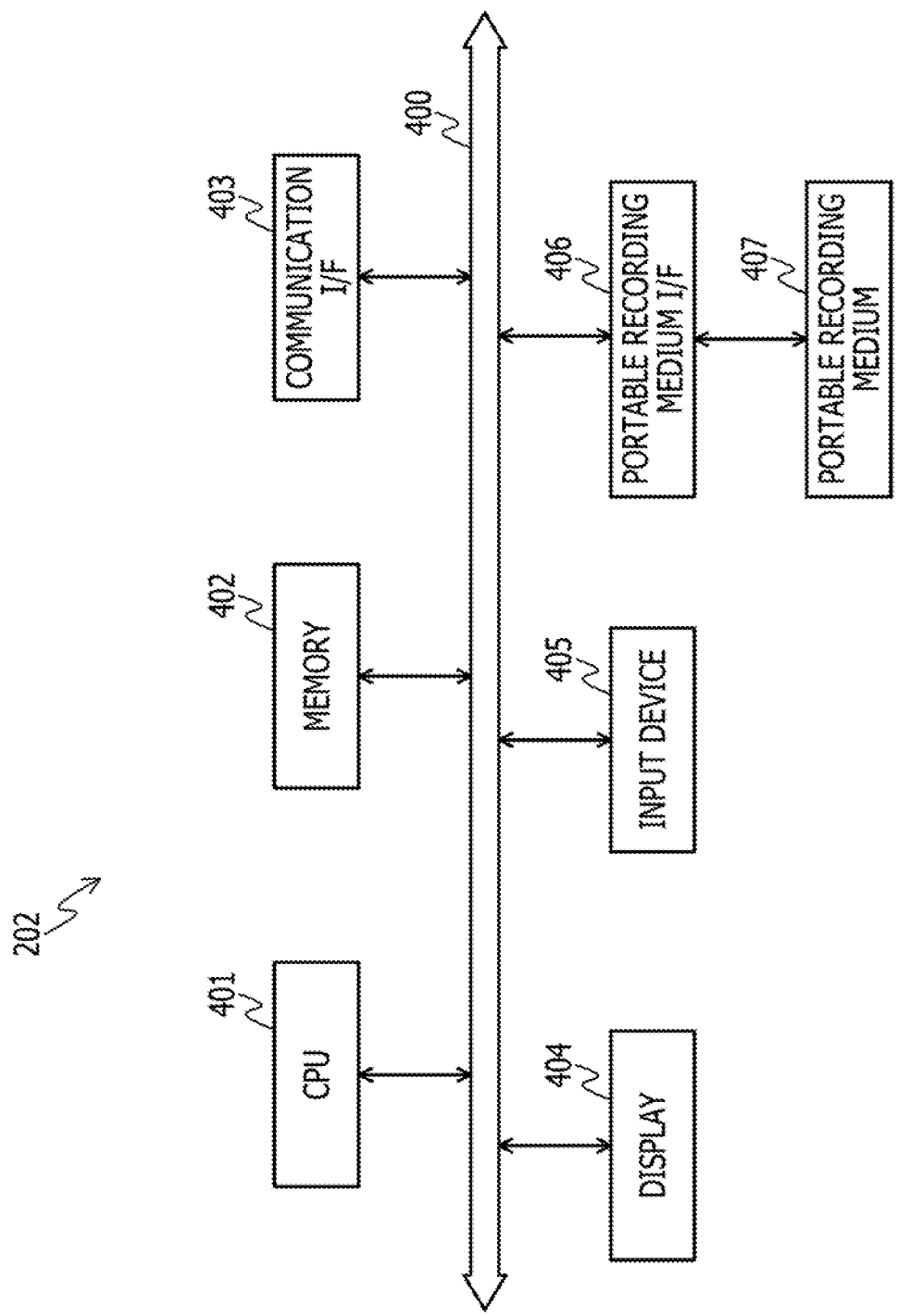
FIG. 4 is a block diagram illustrating an exemplary hardware configuration of a terminal device.

FIG. 4 is a block diagram illustrating an exemplary hardware configuration of the terminal device 202. In FIG. 4, the terminal device 202 includes a CPU 401, a memory 402, a communication I/F 403, a display 404, an input device 405, a portable recording medium I/F 406, and a portable recording medium 407. Furthermore, the components are connected to each other via a bus 400.

Here, the CPU 401 performs overall control of the terminal device 202. The CPU 401 may have a plurality of cores. The memory 402 is a storage unit including, for example, a ROM, a RAM, and a flash ROM. For example, the flash ROM or the ROM stores various programs, while the RAM is used as a work area for the CPU 401. A program stored in the memory 402 is loaded into the CPU 401 to cause the CPU 401 to execute a coded process.

The communication I/F 403 is connected to the network 210 (see FIG. 2) through a communication line and is connected to an external computer (for example, the server 201) via the network 210. Further, the communication I/F 403 then manages an interface between the network 210 and the inside of the own device, and controls input and output of data from an external device.

The display 404 is a display device that displays data such as a document, an image, or function information, as well as a cursor and icons or tool boxes. For example, a liquid crystal display or an organic electroluminescence (EL) display can be adopted as the display 404.

The input device 405 includes keys for inputting characters, numbers, various instructions, and the like, and inputs data. The input device 405 may be a keyboard, a mouse, or the like, or may be a touch-panel input pad, a numeric keypad, or the like.

The portable recording medium I/F 406 controls read and write of data from and into the portable recording medium 407 under the control of the CPU 401. The portable recording medium 407 stores data written under the control of the portable recording medium I/F 406.

Note that the terminal device 202 may include, for example, a hard disk drive (HDD), an SSD, a scanner, and a printer, in addition to the above-described components.

(Exemplary Data Structure of Screen Management Table TB)

Next, an exemplary data structure of the screen management table TB stored in the screen management DB 220 included in the server 201 will be described with reference to FIG. 5.

Figure 5:
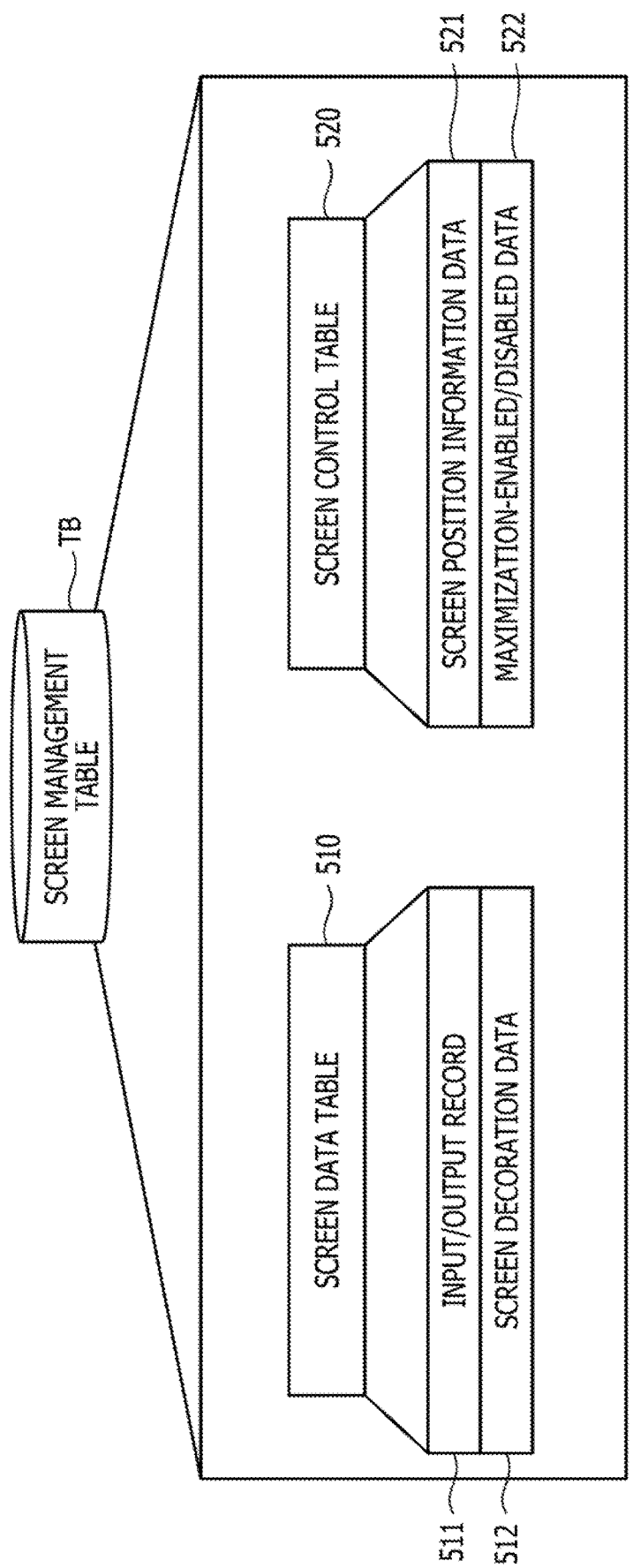
FIG. 5 is an explanatory diagram illustrating an exemplary data structure of a screen management table.

FIG. 5 is an explanatory diagram illustrating an exemplary data structure of the screen management table TB. In FIG. 5, the screen management table TB is an example of setting information that is created for each screen and indicates settings for the screen. The screen management table TB includes a screen data table 510 and a screen control table 520.

The screen data table 510 stores information that constitutes contents displayed on the screen. For example, the screen data table 510 corresponds to data exchanged between the RW style app and the existing runtime system, and includes an input/output record 511 and screen decoration data 512. The input/output record 511 is data relating to input and output items. The screen decoration data 512 is data relating to screen decoration such as the screen size and color scheme.

The screen control table 520 stores information that controls the layout of the screen. For example, the screen control table 520 includes screen position information data 521 and maximization-enabled/disabled data 522. The screen position information data 521 is data relating to the screen position and overlap. The maximization-enabled/disabled data 522 is data that records the maximization state of the screen. The screen control table 520 is used to acquire and control the relative position between and the states of screens being subjected to OPEN at the time of the READ command.

Note that the screen management table TB is stored in the screen management DB 220 such that it can be identified which screen is concerned with the setting information. Furthermore, the screen management DB 220 may store the screen management tables TB in the order in which the screens are launched (OPEN), for example. Specific contents stored in the screen management table TB will be described later with reference to FIGS. 9A to 9F.

(Exemplary Functional Configuration of Server 201)

Figure 6:
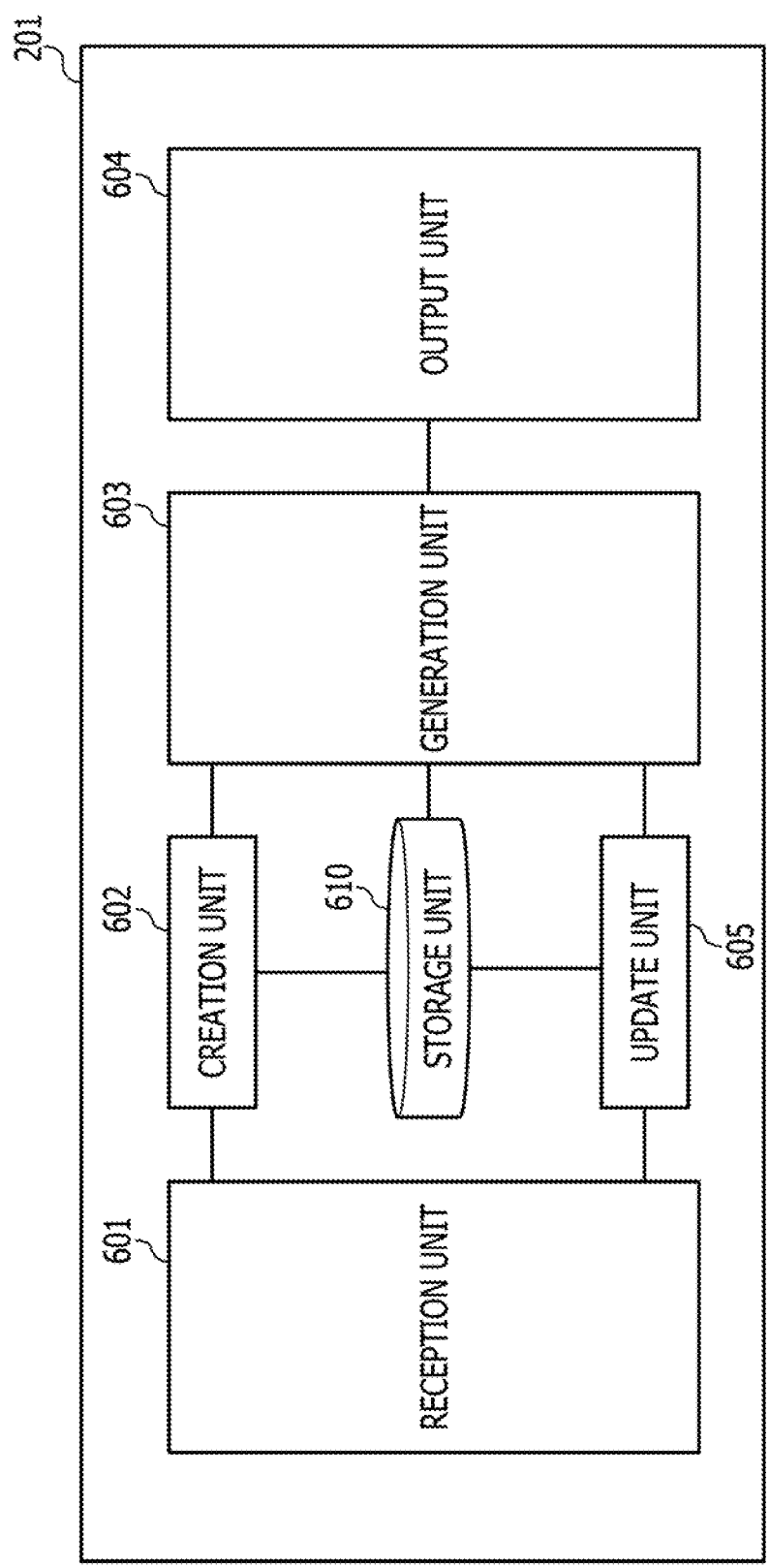
FIG. 6 is a block diagram illustrating an exemplary functional configuration of the server.

FIG. 6 is a block diagram illustrating an exemplary functional configuration of the server 201. In FIG. 6, the server 201 includes a reception unit 601, a creation unit 602, a generation unit 603, an output unit 604, an update unit 605, and a storage unit 610. The reception unit 601 to the update unit 605 have functions serving as a control unit; for example, the functions of these units are implemented by the CPU 301 executing the display control program stored in a storage device such as the memory 302, the disk 304, or the portable recording medium 307, or by the communication I/F 305 illustrated in FIG. 3. For example, each functional unit is implemented by a runtime system RS of the server 201 illustrated in FIG. 7 described later. The processing results of each functional unit are stored into a storage device such as the memory 302 or the disk 304, for example. The storage unit 610 is implemented by a storage device such as the memory 302 or the disk 304, for example. For example, the storage unit 610 corresponds to the screen management DB 220.

The reception unit 601 receives a drawing request to cause the terminal device 202 to draw a new screen, from the app APL that controls input and output of the screen by a sequential process that executes a plurality of processes in a predetermined processing order. The drawing request for a new screen is implemented by, for example, the OPEN command and the WRITE command from the app APL. The drawing request for the screen subjected to OPEN (the launched screen) is implemented by, for example, the WRITE command from the app APL For example, the reception unit 601 receives, from the app APL, the OPEN command to launch a new screen and the WRITE command to draw a new screen.

The creation unit 602 creates setting information indicating settings for a new screen and stores the created setting information in the storage unit 610 in response to receiving a drawing request to draw the new screen. For example, the creation unit 602 creates the screen management table TB corresponding to the new screen and stores the created screen management table TB in the screen management DB 220 in response to receiving the OPEN command for the new screen from the app APL.

The generation unit 603 generates drawing data to draw a new screen. For example, when only the setting information for a new screen is stored in the storage unit 610, the generation unit 603 generates drawing data to draw the new screen, based on the setting information for the new screen. At this time, the generation unit 603 generates drawing data in which the new screen is treated as the input target screen.

Furthermore, when the setting information for each of a plurality of screens including a new screen is stored in the storage unit 610, the generation unit 603 generates drawing data to draw the plurality of screens collectively, based on the setting information for each of the plurality of screens. At this time, the generation unit 603 generates drawing data in which only the new screen among the plurality of screens is treated as the input target screen.

For a more detailed description, for example, the generation unit 603 reads the screen management table TB from the screen management DB 220 in response to receiving the WRITE command from the app APL. Next, the generation unit 603 specifies the input target screen by referring to the read screen management table TB.

For example, a case where there is the screen management table TB for each of a plurality of screens is assumed. In this case, the generation unit 603 specifies a screen for which the OPEN command has been received most recently, as the input target screen. Furthermore, information that specifies the input target screen may be included in the WRITE command from the app APL. In this case, the generation unit 603 may specify the screen targeted for input, from information included in the WRITE command.

Then, the generation unit 603 treats the specified screen as the input target screen, and generates drawing data to draw the plurality of screens collectively, based on the screen management table TB for each of the plurality of screens. For example, the generation unit 603 refers to the screen control table 520 of the screen management table TB for each of the plurality of screens to generate screen control information. The screen control information is information associated with screen control, and indicates, for example, the display position of the screen, the overlap between the screens, and the maximization state of the screen.

Furthermore, the generation unit 603 refers to the screen data table 510 of the screen management table TB for each of the plurality of screens to generate screen display information. The screen display information is information associated with contents of the screen to be displayed. However, for screens other than the input target screen, for example, input items are converted into output items (deactivated) such that data input is blocked from being received.

The screen control information and the screen display information are generated using, for example, a markup language such as HyperText Markup Language (HTML) or a script language such as JavaScript (registered trademark). Then, the generation unit 603 generates screen information including the screen control information and the screen display information for each of the plurality of screens. For a more detailed description, for example, the generation unit 603 uses HTML and JavaScript to generate screen information that enables to manipulate each screen as a part within one screen.

The output unit 604 outputs the generated drawing data. For example, the output unit 604 transmits drawing data to draw a new screen, to the terminal device 202. As a result, a new screen is displayed on the display 404 (see FIG. 4) by the browser br of the terminal device 202. Furthermore, the output unit 604 transmits, to the terminal device 202, drawing data to draw a plurality of screens including a new screen collectively. As a result, the plurality of screens is displayed in one screen collectively on the display 404 by the browser br of the terminal device 202, for example.

The update unit 605 acquires the data input to the input target screen displayed on the terminal device 202, and updates the setting information stored in the storage unit 610 based on the acquired data. For example, the update unit 605 is placed in a standby state for data input to the input target screen, in response to receiving the READ command from the app APL.

When data is input to the input target screen, the update unit 605 reads the input data. At this time, the update unit 605 may read information that specifies the state of the screen (the position, the overlap, the maximization state, and the like of the screen). Then, the update unit 605 updates the screen management table TB stored in the screen management DB 220, based on the input data.

For a more detailed description, for example, the update unit 605 updates the screen data table 510 included in the screen management table TB, based on the input data. Furthermore, the update unit 605 updates the screen control table 520 included in the screen management table TB, based on the information that specifies the state of the screen.

In addition, the generation unit 603 generates drawing data to draw a screen based on the updated setting information stored in the storage unit 610. For example, it is assumed that the setting information for each of a plurality of screens stored in the storage unit 610 has been updated. In this case, in response to receiving, from the app APL, a drawing request (WRITE command) to cause the terminal device 202 to draw a screen, the generation unit 603 specifies a screen targeted for input from among the plurality of screens, based on the updated setting information for each of the plurality of screens. Then, the generation unit 603 treats only the specified screen as the input target screen, and generates drawing data to draw the plurality of screens collectively. The generated drawing data is transmitted to the terminal device 202. As a result, the plurality of screens reflecting data input to the input target screen and the updated contents of each screen based on state changes in the screens being subjected to OPEN is displayed by the browser br of the terminal device 202.

Furthermore, the reception unit 601 receives, from the app APL, a drawing end request to end the drawing of any screen drawn on the terminal device 202. For example, the reception unit 601 receives the CLOSE command to terminate the screen, from the application APL The CLOSE command includes, for example, information that specifies a screen targeted for CLOSE.

In addition, when receiving, from the app APL, a drawing end request to end the drawing of any screen drawn on the terminal device 202, the update unit 605 deletes the setting information for the any screen stored in the storage unit 610. For example, the update unit 605 deletes the screen management table TB corresponding to the CLOSE command stored in the screen management DB 220 in response to the CLOSE command from the app APL.

Furthermore, when the setting information for any screen stored in the storage unit 610 is deleted, the generation unit 603 generates drawing data to draw the remaining screens based on the setting information for the remaining screens stored in the storage unit 610. In this case, the output unit 604 transmits the generated drawing data to draw the remaining screens, to the terminal device 202.

For example, it is assumed that the setting information for any screen among pieces of setting information for a plurality of screens stored in the storage unit 610 has been deleted. In this case, in response to receiving, from the app APL, a drawing request (WRITE command) to cause the terminal device 202 to draw a screen, the generation unit 603 specifies a screen targeted for input from among screens other than the any screen among the plurality of screens, based on the setting information for each of the screens other than the any screen among the plurality of screens. Then, the generation unit 603 treats only the specified screen as the input target screen, and generates drawing data to draw the screens other than the any screen collectively. The generated drawing data is transmitted to the terminal device 202. As a result, the remaining screens other than the screen targeted for CLOSE are displayed by the browser br of the terminal device 202.

Note that, when all pieces of setting information are deleted from the storage unit 610, the generation unit 603 generates, for example, drawing data to draw an initialized screen (blank screen). In this case, the output unit 604 transmits the generated drawing data to draw the initialized screen (blank screen), to the terminal device 202.

(Exemplary Operation for Each Command from App APL)

Next, an exemplary operation of the runtime system RS of the server 201 for each command from the app APL will be described.

Figure 7:
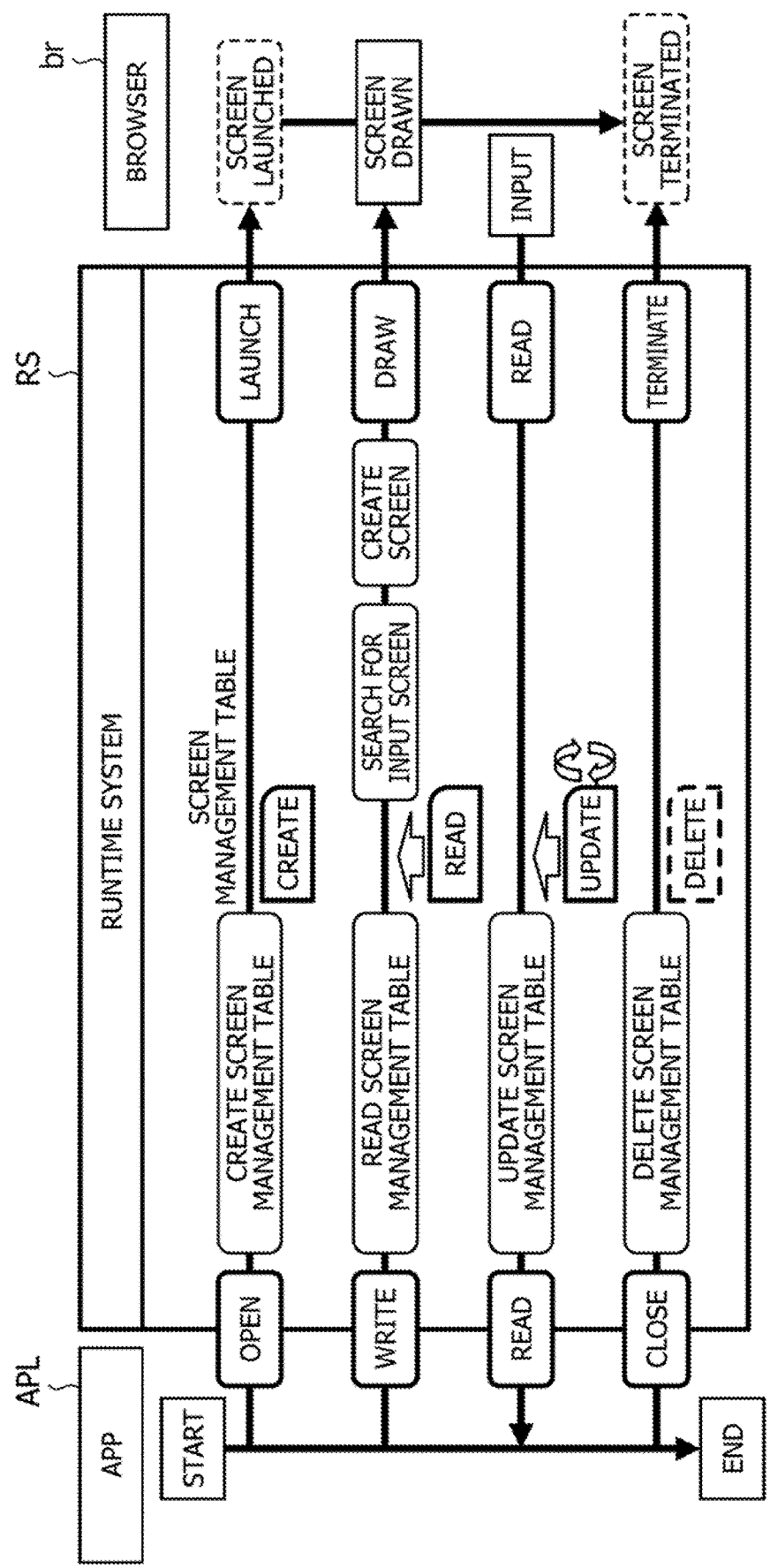
FIG. 7 is an explanatory diagram illustrating exemplary operations for each command from an application.

FIG. 7 is an explanatory diagram illustrating exemplary operations for each command from the app. As illustrated in FIG. 7, the runtime system RS performs an OPEN process to subsequently perform a WRITE process and a READ process, and then performs a CLOSE process in response to each command from the app APL. Hereinafter, an exemplary operation for each command will be described.

OPEN Command

The runtime system RS creates the screen management table TB corresponding to a screen targeted for OPEN (new screen) and stores the created screen management table TB in the screen management DB 220 in response to the OPEN command from the app APL As a result, the screen targeted for OPEN is launched in the browser br. However, at this time point, the screen is a blank screen.

WRITE Command

The runtime system RS reads the screen management table TB from the screen management DB 220 in response to the WRITE command from the app APL. Next, the runtime system RS specifies a screen to be treated as the input target screen by referring to the read screen management table TB. The information that specifies the input target screen is included in the WRITE command from the app APL, for example. Then, the runtime system RS treats the specified screen as the input target screen, and generates drawing data to draw all the screens subjected to OPEN collectively, to transmit the generated drawing data to the browser br. As a result, all the screens subjected to OPEN are drawn collectively in one screen in the browser br.

READ Command

The runtime system RS is placed in a standby state for data input to the input target screen in response to the READ command from the app APL. Here, once data is input to the input target screen, the runtime system RS reads the input data and information that specifies the state of the screen, and updates the screen management table TB stored in the screen management DB 220.

CLOSE Command

The runtime system RS deletes, from the screen management DB 220, the screen management table TB corresponding to a screen targeted for CLOSE in response to the CLOSE command from the app APL. The information that specifies the screen targeted for CLOSE is included in the CLOSE command from the app APL, for example. As a result the screen targeted for CLOSE, which has been launched in the browser br, is terminated.

(Exemplary Operation for Each Command from App APL)

Next, exemplary operations of the runtime system RS of the server 201 when displaying a plurality of screens in response to each command from the app APL will be described.

Figure 8:
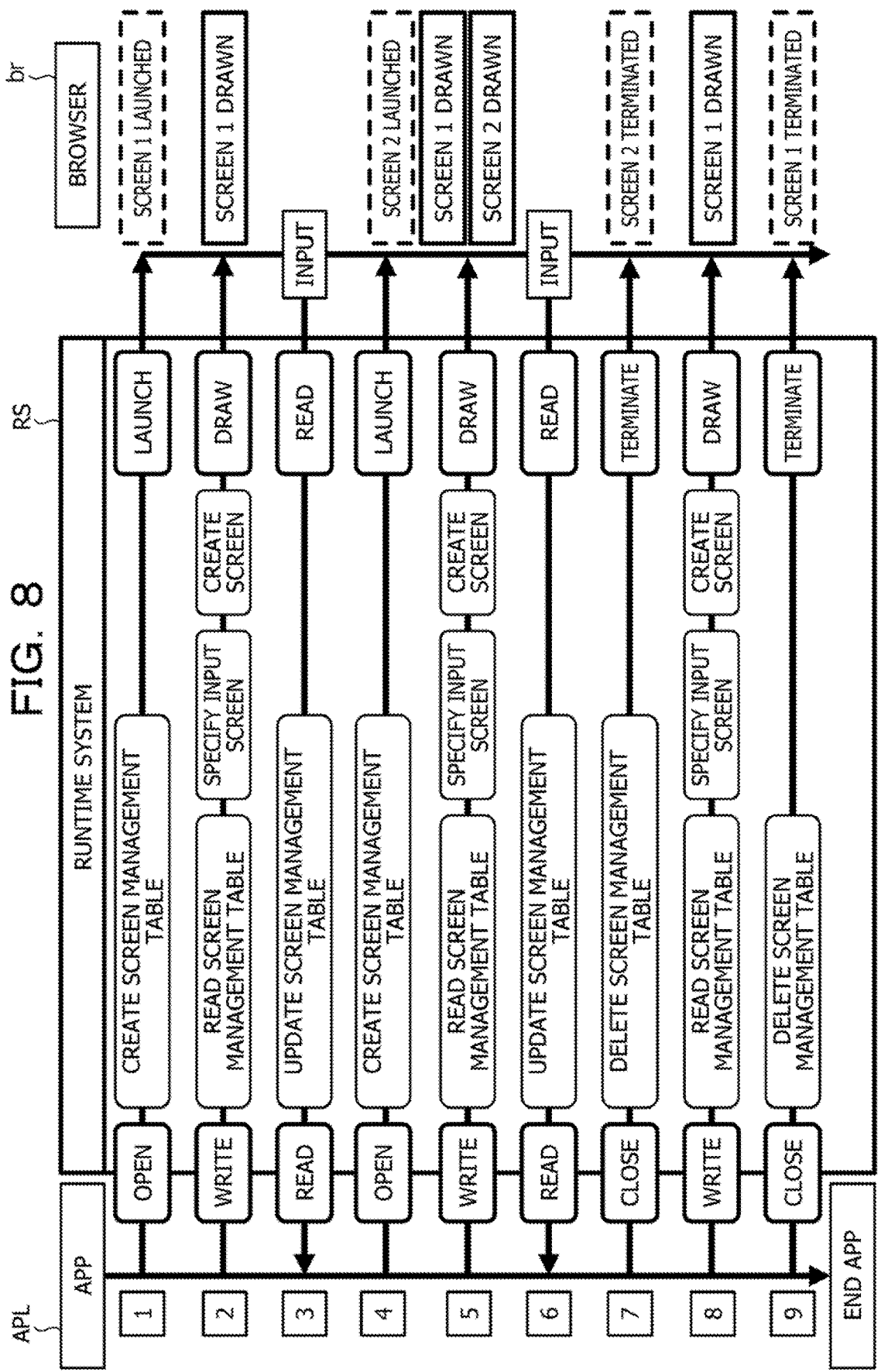
FIG. 8 is an explanatory diagram illustrating exemplary operations when displaying a plurality of screens in response to each command from the application.

FIG. 8 is an explanatory diagram illustrating exemplary operations when displaying a plurality of screens in response to each command from the app. Furthermore, FIGS. 9A to 9F are each an explanatory diagram illustrating exemplary contents stored in the screen management table. In addition, FIGS. 10A to 10I are each an explanatory diagram illustrating an exemplary display of the screen.

In (1) of FIG. 8, the runtime system RS creates the screen management table TB corresponding to a screen 1 and stores the created screen management table TB in the screen management DB 220 in response to receiving the OPEN command for the screen 1 from the app APL The screen 1 is assumed to be a screen with a background color of pink having one input item and one output item.

Figure 9A:
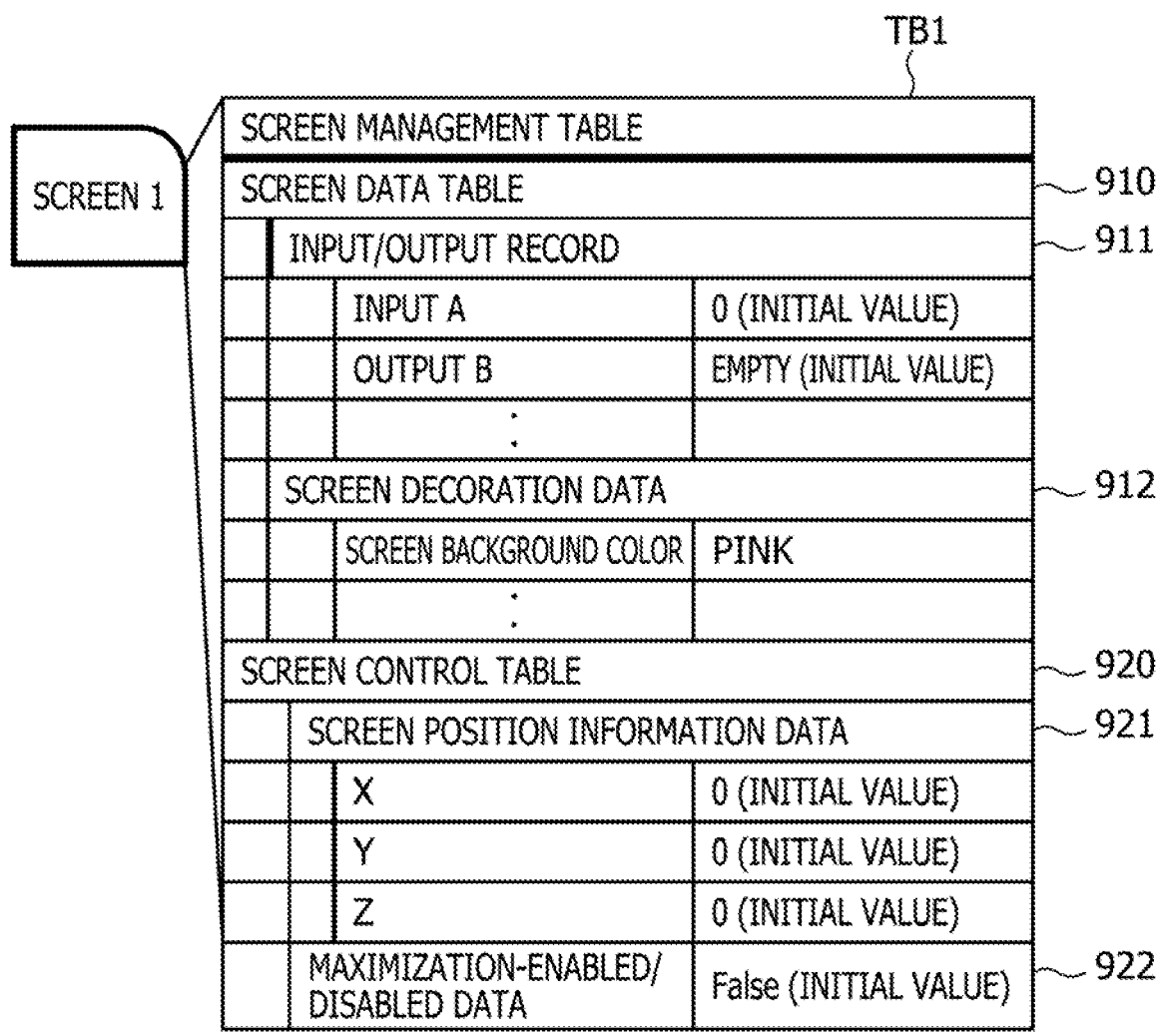
FIG. 9A is an explanatory diagram (part 1) illustrating exemplary contents stored in the screen management table.

In FIG. 9A, a screen management table TB1 stored in the screen management DB 220 is illustrated. The screen management table TB1 is a screen management table corresponding to the screen 1. The screen management table TB1 includes a screen data table 910 and a screen control table 920. The screen data table 910 includes an input/output record 911 and screen decoration data 912. The input/output record 911 indicates, for example, the initial value (0) of an input item A and the initial value (empty) of an output item B. The screen decoration data 912 indicates the background color "pink" of the screen 1, for example. The screen control table 920 includes screen position information data 921 and maximization-enabled/disabled data 922. The screen position information data 921 indicates the position (X, Y, Z) of the screen 1, for example. The maximization-enabled/disabled data 922 indicates the maximization state "False (initial value)" of the screen 1.

Figure 10A:
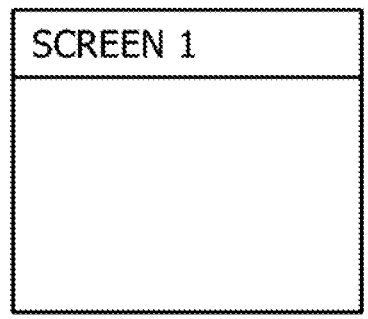
FIG. 10A is an explanatory diagram (part 1) illustrating an exemplary display of the screen.

In FIG. 10A, the screen 1 is a screen targeted for OPEN, which has been launched in the browser br. However, at this time point, the screen 1 is a blank screen.

In (2) of FIG. 8, the runtime system RS reads the screen management table TB from the screen management DB 220 in response to receiving the WRITE command from the app APL. Here, the screen management table TB1 illustrated in FIG. 9A is read. Next, the runtime system RS specifies the input target screen by referring to the read screen management table TB1.

Since there is only the screen management table TB1 here, the runtime system RS specifies the screen 1 as the input target screen. Note that information that specifies the input target screen (screen 1) may be included in the WRITE command from the app APL Then, the runtime system RS treats the screen 1 as the input target screen, and generates drawing data to draw the screen 1, based on the screen management table TB1, to transmit the generated drawing data to the browser br.

Figure 10B:
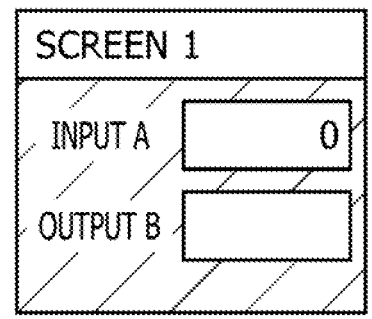
FIG. 10B is an explanatory diagram (part 2) illustrating an exemplary display of the screen.

In FIG. 10B, the screen 1 is a screen drawn in the browser br. Upon receiving the drawing data from the runtime system RS, the browser br reads the received drawing data and draws the screen 1. The screen 1 is assumed to be a screen with a background color of pink including the input item A and the output item B. In the input item A, 0 (initial value) is displayed. The output item B is empty.

In (3) of FIG. 8, the runtime system RS is placed in a standby state for data input to the input target screen in response to receiving the READ command from the app APL Once data is input to the input target screen, the runtime system RS reads the input data and information that specifies the state of the screen. Then, the runtime system RS updates the screen management table TB stored in the screen management DB 220 based on the input data and information that specifies the state of the screen.

Figure 10C:
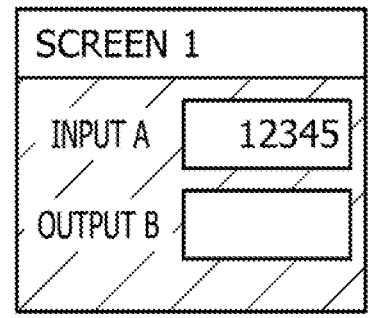
FIG. 10C is an explanatory diagram (part 3) illustrating an exemplary display of the screen.

In FIG. 10C, "12345" has been input in the input item A of the screen 1, which is the input target screen. In this case, the runtime system RS reads the input item A "12345" and information that specifies the state of the screen 1 (the position and maximization state of the screen). Then, the runtime system RS updates the screen management table TB1 corresponding to the screen 1, based on the input item A "12345" and the information that specifies the state of the screen 1.

In FIG. 9B, the updated screen management table TB1 is illustrated. Here, in the screen management table TB1, "12345" is set in the input item A of the input/output record 911 in the screen data table 910. Furthermore, (10, 20, 1) is set for the position (X, Y, Z) of the screen 1 in the screen position information data 921 in the screen control table 920.

In (4) of FIG. 8, the runtime system RS creates the screen management table TB corresponding to a screen 2 and stores the created screen management table TB in the screen management DB 220 in response to receiving the OPEN command for the screen 2 from the app APL. The screen 2 is assumed to be a screen with a background color of light blue having one input item and one output item. Furthermore, it is assumed that the value of the input item A on the screen 1 is output to an output item A of the screen 2, and the value of an input item B on the screen 2 is output to the output item B of the screen 1.

Figure 9C:
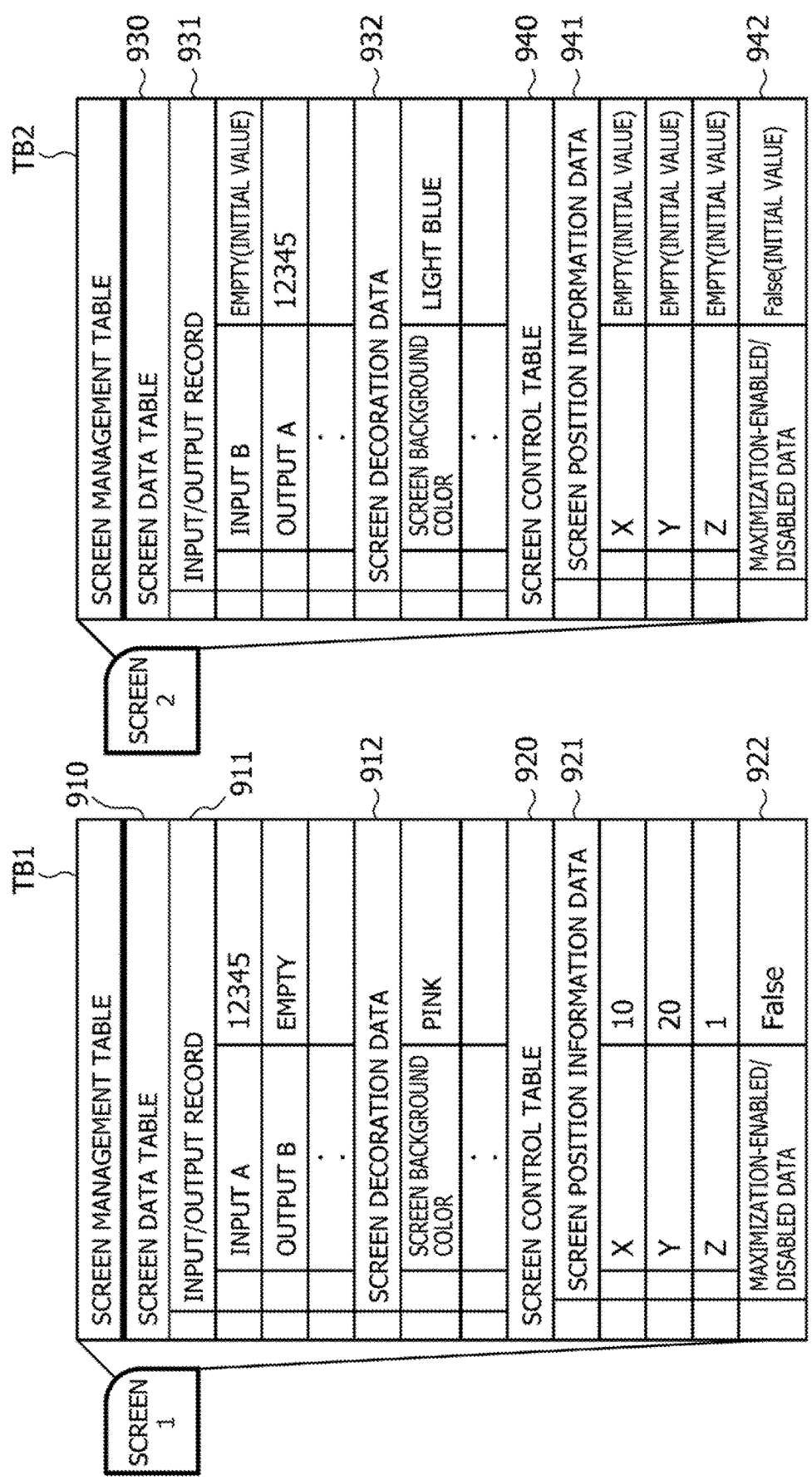
FIG. 9C is an explanatory diagram (part 3) illustrating exemplary contents stored in the screen management table.

In FIG. 9C, the screen management table TB1 and a screen management table TB2 stored in the screen management DB 220 are illustrated. The screen management table TB2 is a screen management table corresponding to the screen 2. The screen management table TB2 includes a screen data table 930 and a screen control table 940. The screen data table 930 includes an input/output record 931 and screen decoration data 932. The input/output record 931 indicates, for example, the initial value (empty) of the input item B and the value "12345" of the output item A. The screen decoration data 932 indicates the background color "light blue" of the screen 2, for example. The screen control table 940 includes screen position information data 941 and maximization-enabled/disabled data 942. The screen position information data 941 indicates the position (X, Y, Z) of the screen 2, for example. The maximization-enabled/disabled data 942 indicates the maximization state "False (initial value)" of the screen 2.

Figure 10D:
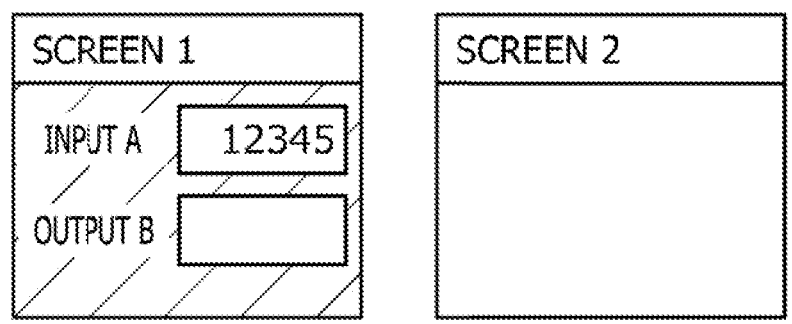
FIG. 10D is an explanatory diagram (part 4) illustrating exemplary displays of the screens.

In FIG. 10D, the screens 1 and 2 are illustrated. The screen 2 is a screen targeted for OPEN, which has been newly launched in the browser br. However, at this time point, the screen 2 is a blank screen.

In (5) of FIG. 8, the runtime system RS reads the screen management table TB from the screen management DB 220 in response to receiving the WRITE command from the app APL Here, the screen management table TB1 and the screen management table TB2 illustrated in FIG. 9C are read. Next, the runtime system RS specifies the input target screen by referring to the read screen management tables TB1 and TB2.

Here, the runtime system RS specifies the screen 2, for which the OPEN command has been received most recently, as the input target screen from among the screens 1 and 2. Note that information that specifies the input target screen (screen 2) may be included in the WRITE command from the app APL Then, the runtime system RS treats only the screen 2 as the input target screen among the screens 1 and 2, and generates drawing data to draw both of the screens 1 and 2 collectively, based on the screen management tables TB1 and TB2, to transmit the generated drawing data to the browser br.

Figure 10E:
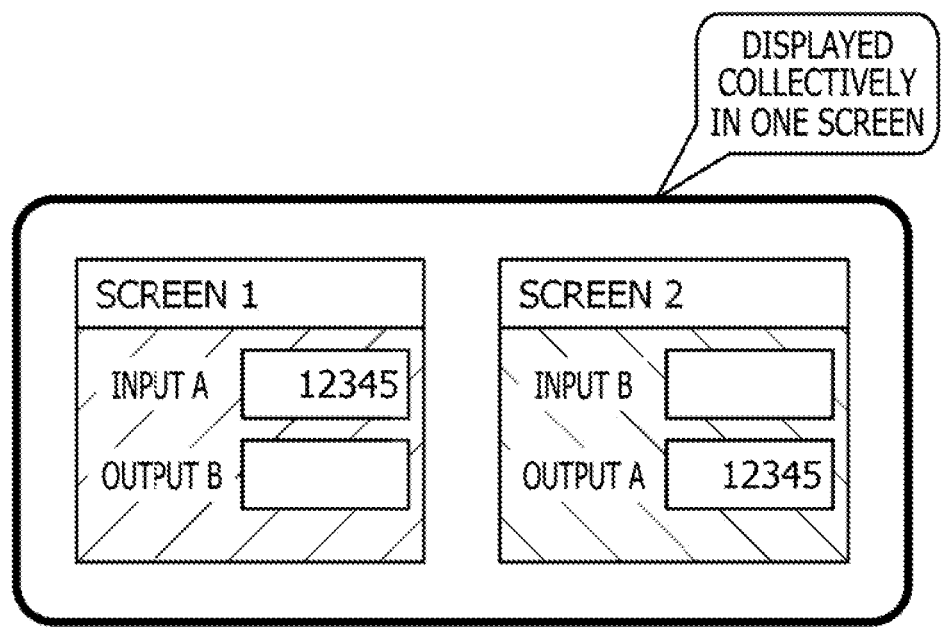
FIG. 10E is an explanatory diagram (part 5) illustrating an exemplary display of the screen.

In FIG. 10E, the screens 1 and 2 are screens drawn on the browser br. Upon receiving the drawing data from the runtime system RS, the browser br reads the received drawing data and draws both of the screens 1 and 2 collectively. The value "12345" input to the input item A of the screen 1 has been output to the output item A of the screen 2. However, since only the screen 2 (input item B) among the screens 1 and 2 is the input target screen, the screen 1 (input item A) is in a state for blocking input from being received.

The runtime system RS holds the screen management tables TB of all the screens subjected to OPEN, and thus is allowed to draw a plurality of screens in the browser br with one WRITE command from the app APL. At this time, the runtime system RS is allowed to control such that only the screen 2 is treated as the input target screen and data input to the screen 1 is blocked from being received.

In (6) of FIG. 8, the runtime system RS is placed in a standby state for data input to the input target screen in response to receiving the READ command from the app APL.

Figure 10F:
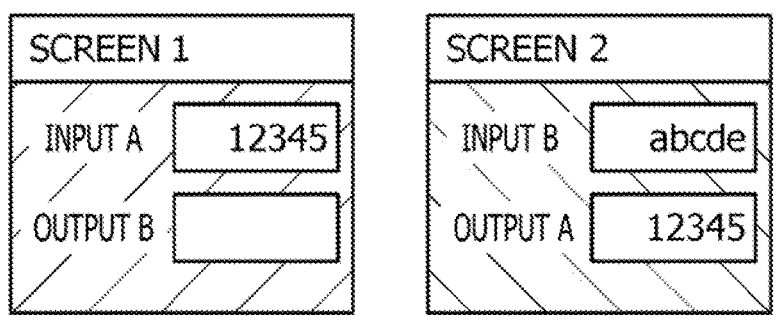
FIG. 10F is an explanatory diagram (part 6) illustrating exemplary displays of the screens.

In FIG. 10F, "abcde" has been input in the input item B of the screen 2, which is the input target screen. In this case, the runtime system RS reads the input item B "abcde" and information that specifies the states of the screens 1 and 2 (the positions and maximization states of the screens). Then, the runtime system RS updates the screen management tables TB1 and TB2 corresponding to the screens 1 and 2, based on the input item B "abcde" and the information that specifies the states of the screens 1 and 2.

Figure 9D:
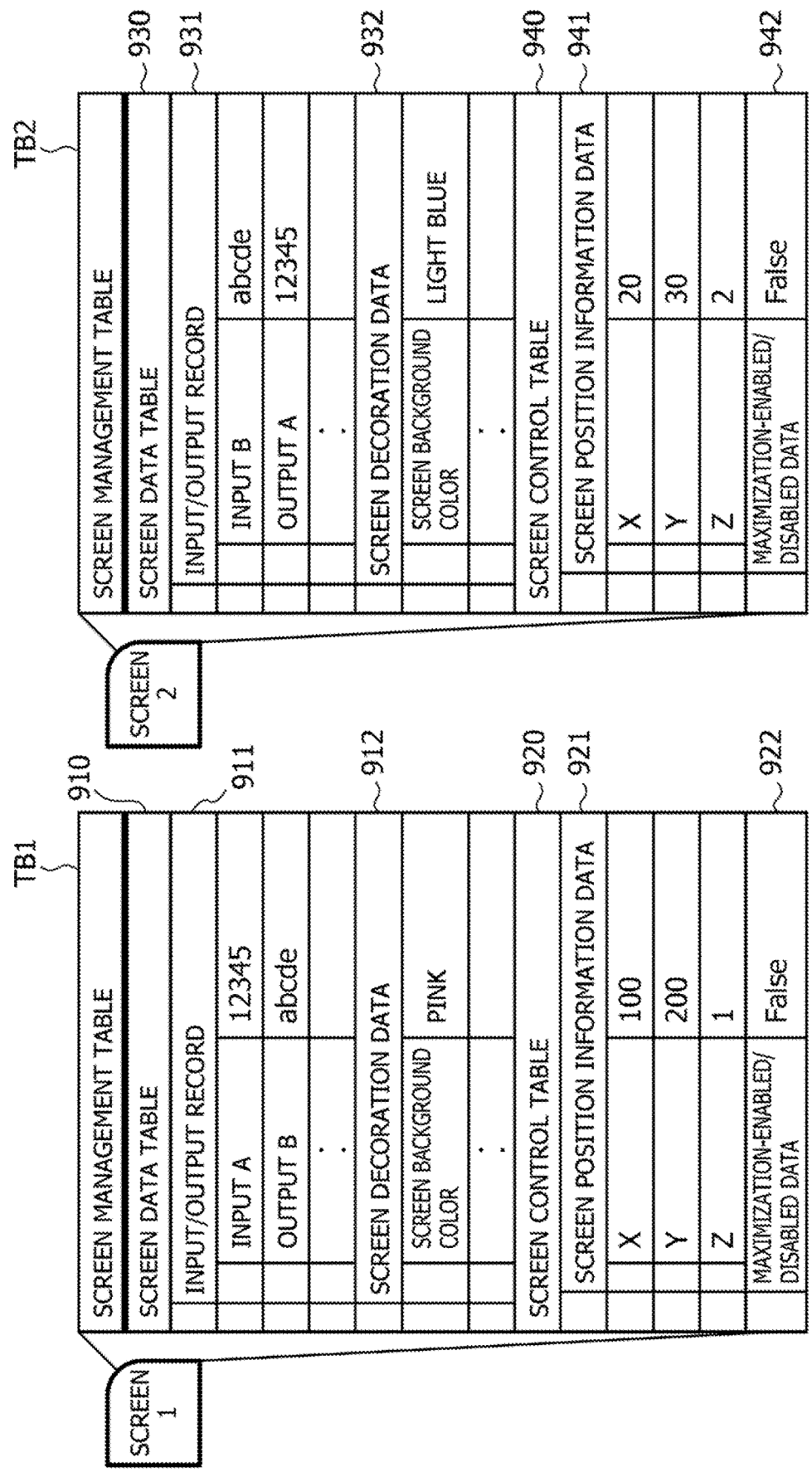
FIG. 9D is an explanatory diagram (part 4) illustrating exemplary contents stored in the screen management table.

In FIG. 9D, the updated screen management tables TB1 and TB2 are illustrated. Here, in the screen management table TB1, "abcde" is set in the output item B of the input/output record 911 in the screen data table 910. Furthermore, (100, 200, 1) is set for the position (X, Y, Z) of the screen 1 in the screen position information data 921 in the screen control table 920. In addition, the maximization state "False" of the screen 1 is set in the maximization-enabled/disabled data 922 in the screen control table 920.

Meanwhile, in the screen management table TB2, "abcde" is set in the input item B of the input/output record 931 in the screen data table 930. Furthermore, (20, 30, 2) is set for the position (X, Y, Z) of the screen 2 in the screen position information data 941 in the screen control table 940. In addition, the maximization state "False" of the screen 2 is set in the maximization-enabled/disabled data 942 in the screen control table 940.

Figure 10G:
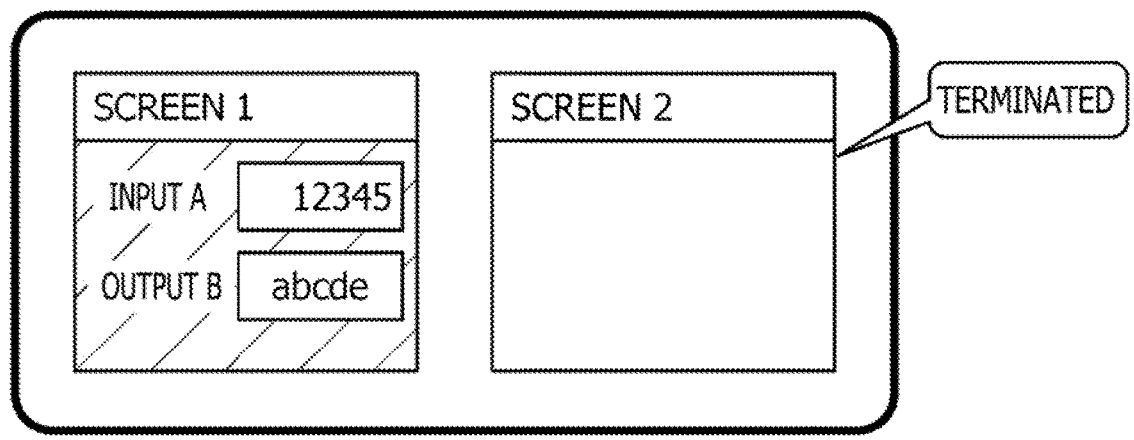
FIG. 10G is an explanatory diagram (part 7) illustrating an exemplary display of the screen.

In (7) of FIG. 8, the runtime system RS deletes the screen management table TB2 corresponding to the screen 2 from the screen management DB 220 in response to receiving the CLOSE command for the screen 2 from the app APL, as illustrated in FIG. 9E. Then, the runtime system RS terminates the screen 2 displayed in the browser br. As a result, as illustrated in FIG. 10G, the screen 2 among the screens 1 and 2 displayed in the browser br is terminated.

In (8) of FIG. 8, the runtime system RS reads the screen management table TB from the screen management DB 220 in response to receiving the WRITE command from the app APL Here, the screen management table TB1 illustrated in FIG. 9E is read. Next, the runtime system RS specifies the input target screen by referring to the read screen management table TB1.

Figure 10H:
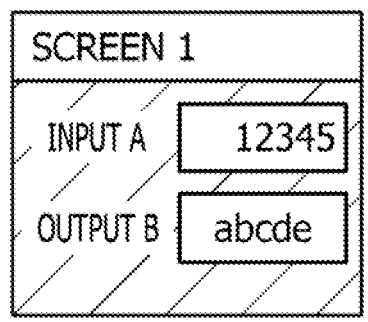
FIG. 10H is an explanatory diagram (part 8) illustrating an exemplary display of the screen.

Since there is only the screen management table TB1 here, the runtime system RS specifies the screen 1 as the input target screen. Note that information that specifies the input target screen (screen 1) may be included in the WRITE command from the app APL. Then, the runtime system RS treats the screen 1 as the input target screen, and generates drawing data to draw the screen 1, based on the screen management table TB1, to transmit the generated drawing data to the browser br. As a result, as illustrated in FIG. 10H, only the screen 1 is drawn in the browser br.

Figure 9F:
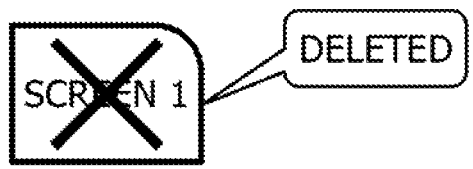
FIG. 9F is an explanatory diagram (part 6) illustrating exemplary contents stored in the screen management table.
Figure 10I:
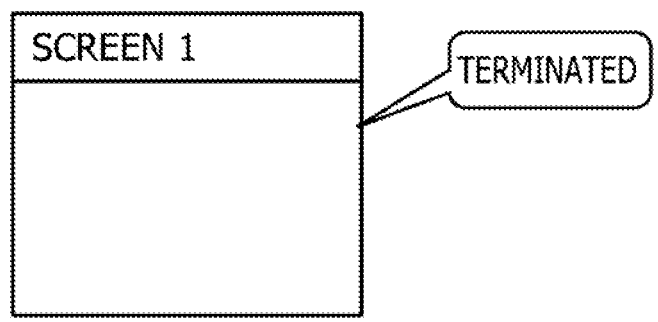
FIG. 10I is an explanatory diagram (part 9) illustrating an exemplary display of the screen.

In (9) of FIG. 8, the runtime system RS deletes the screen management table TB1 corresponding to the screen 1 from the screen management DB 220 in response to receiving the CLOSE command for the screen 1 from the app APL, as illustrated in FIG. 9F. Then, the runtime system RS terminates the screen 1 displayed in the browser br. As a result, as illustrated in FIG. 10I, the screen 1 displayed in the browser br is terminated.

As described above, according to the runtime system RS, by using the screen management table TB of each screen subjected to OPEN, an output process performed for a plurality of screens in one communication may be enabled even in the case of the sequential processing app APL Consequently, the control of a plurality of screens without altering the RW style legacy assets may be implemented. In addition, since the display does not depend on the client environment, the control of a plurality of screens in legacy assets in the RW style may be implemented in a multi-device environment.

(Procedure in Display Control Process of Server 201)

Next, the procedure in a display control process of the server 201 will be described with reference to FIG. 11.

Figure 11:
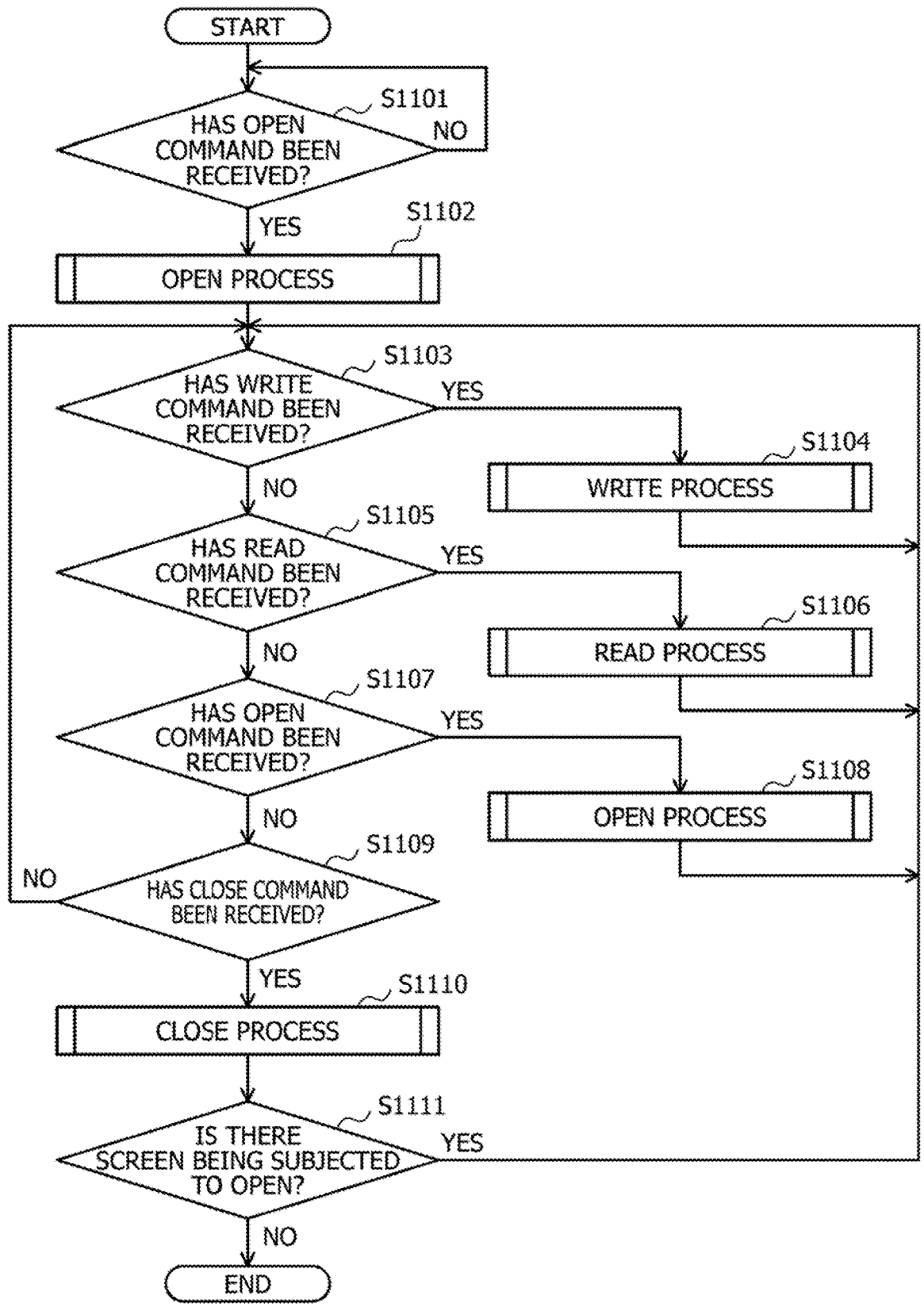
FIG. 11 is a flowchart illustrating an exemplary procedure in a display control process to be performed by the server.

FIG. 11 is a flowchart illustrating an exemplary procedure in a display control process to be performed by the server 201. In the flowchart in FIG. 11, first, the server 201 determines whether or not the OPEN command has been received from the app APL (step S1101). Here, the server 201 waits for the reception of the OPEN command (step S1101: No).

Then, when the OPEN command has been received (step S1101: Yes), the server 201 executes the OPEN process (step S1102). The specific processing procedure in the OPEN process will be described later with reference to FIG. 12.

Next, the server 201 determines whether or not the WRITE command has been received from the app APL (step S1103). Here, when the WRITE command has been received (step S1103: Yes), the server 201 executes the WRITE process (step S1104) and returns to step S1103. The specific processing procedure in the WRITE process will be described later with reference to FIG. 13.

On the other hand, when the WRITE command has not been received (step S1103: No), the server 201 determines whether or not the READ command has been received from the app APL (step S1105). Here, when the READ command has been received (step S1105: Yes), the server 201 executes the READ process (step S1106) and returns to step S1103. The specific processing procedure in the READ process will be described later with reference to FIG. 14.

On the other hand, when the READ command has not been received (step S1105: No), the server 201 determines whether or not the OPEN command has been received from the app APL (step S1107). Here, when the OPEN command has been received (step S1107: Yes), the server 201 executes the OPEN process (step S1108) and returns to step S1103.

On the other hand, when the OPEN command has not been received (step S1107: No), the server 201 determines whether or not the CLOSE command has been received from the app APL (step S1109). Here, when the CLOSE command has not been received (step S1109: No), the server 201 returns to step S1103.

On the other hand, when the CLOSE command has been received (step S1109: Yes), the server 201 executes the CLOSE process (step S1110). The specific processing procedure in the CLOSE process will be described later with reference to FIG. 15. Then, the server 201 determines whether or not there is a screen being subjected to OPEN (step S1111).

Here, when there is a screen being subjected to OPEN (step S1111: Yes), the server 201 returns to step S1103. On the other hand, when there is no screen being subjected to OPEN (step S1111: No), the server 201 ends the series of processes according to this flowchart.

Consequently, various processes may be executed according to the commands (OPEN, WRITE, READ, and CLOSE) from the app APL.

Next, the specific processing procedure in the OPEN process in steps S1102 and S1108 illustrated in FIG. 11 will be described with reference to FIG. 12.

Figure 12:
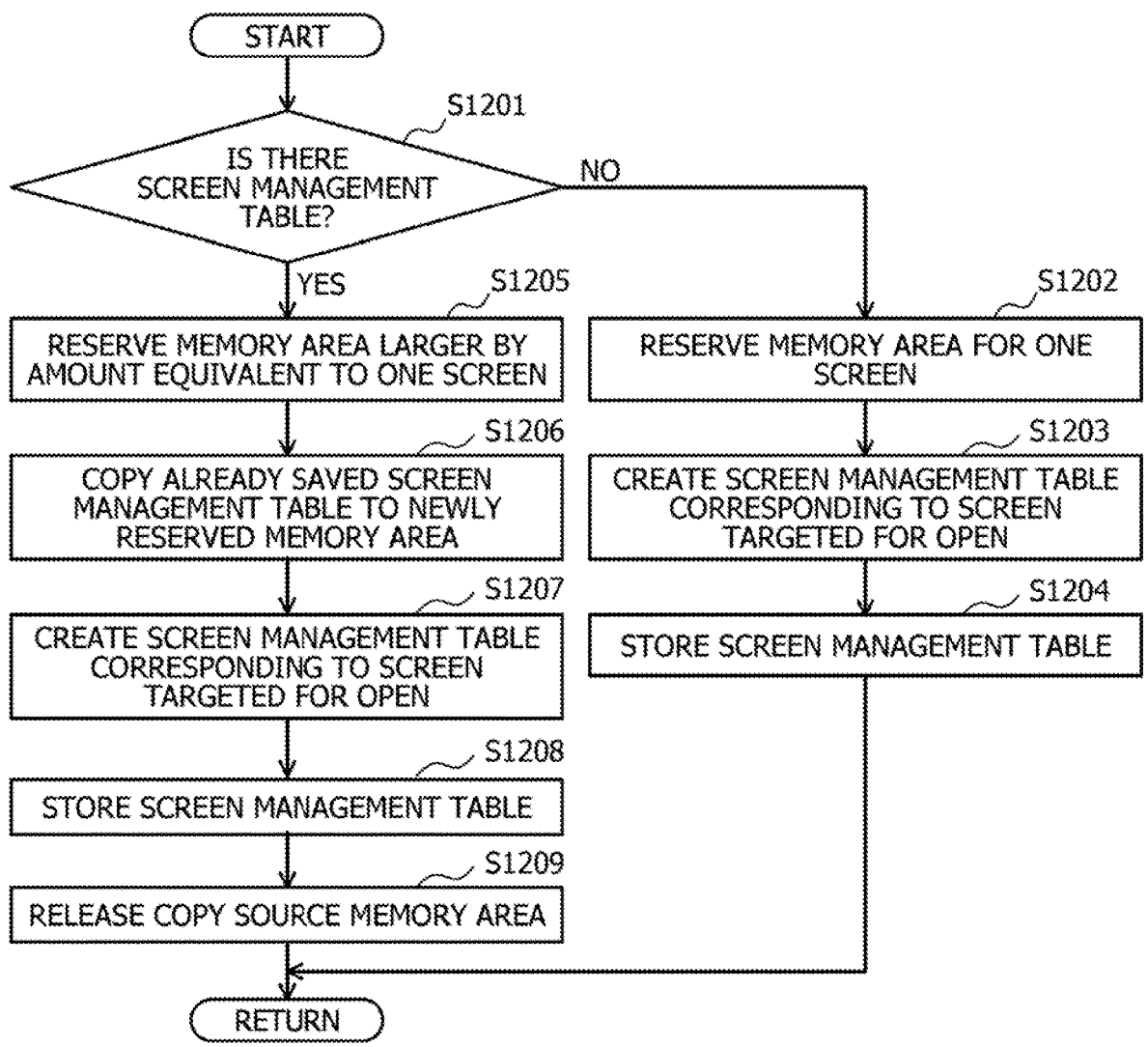
FIG. 12 is a flowchart illustrating an exemplary specific processing procedure in an OPEN process.

FIG. 12 is a flowchart illustrating an exemplary specific processing procedure in the OPEN process. In the flowchart in FIG. 12, first, the server 201 determines whether or not the screen management DB 220 contains the screen management table TB (step S1201).

Here, when the screen management table TB is not contained (step S1201: No), the server 201 reserves a memory area expected for the screen management table TB for one screen (step S1202). This memory area corresponds to the screen management DB 220.

Next, the server 201 creates the screen management table TB corresponding to a screen targeted for OPEN (step S1203). Then, the server 201 stores the created screen management table TB in the reserved memory area (step S1204), and returns to the step in which the OPEN process was called.

Furthermore, when the screen management table TB is contained in step S1201 (step S1201: Yes), the server 201 reserves a memory area larger than the currently reserved memory area by an amount equivalent to one screen (step S1205). Then, the server 201 copies the already saved screen management table TB to the newly reserved memory area (step S1206).

Next, the server 201 creates the screen management table TB corresponding to a screen targeted for OPEN (step S1207). Then, the server 201 stores the created screen management table TB in the reserved memory area (step S1208), releases the copy source memory area (step S1209), and returns to the step in which the OPEN process was called.

Consequently, the screen management tables TB for all the screens subjected to OPEN may be created and held in the screen management DB 220 (memory area).

Next, the specific processing procedure in the WRITE process in step S1104 illustrated in FIG. 11 will be described with reference to FIG. 13.

Figure 13:
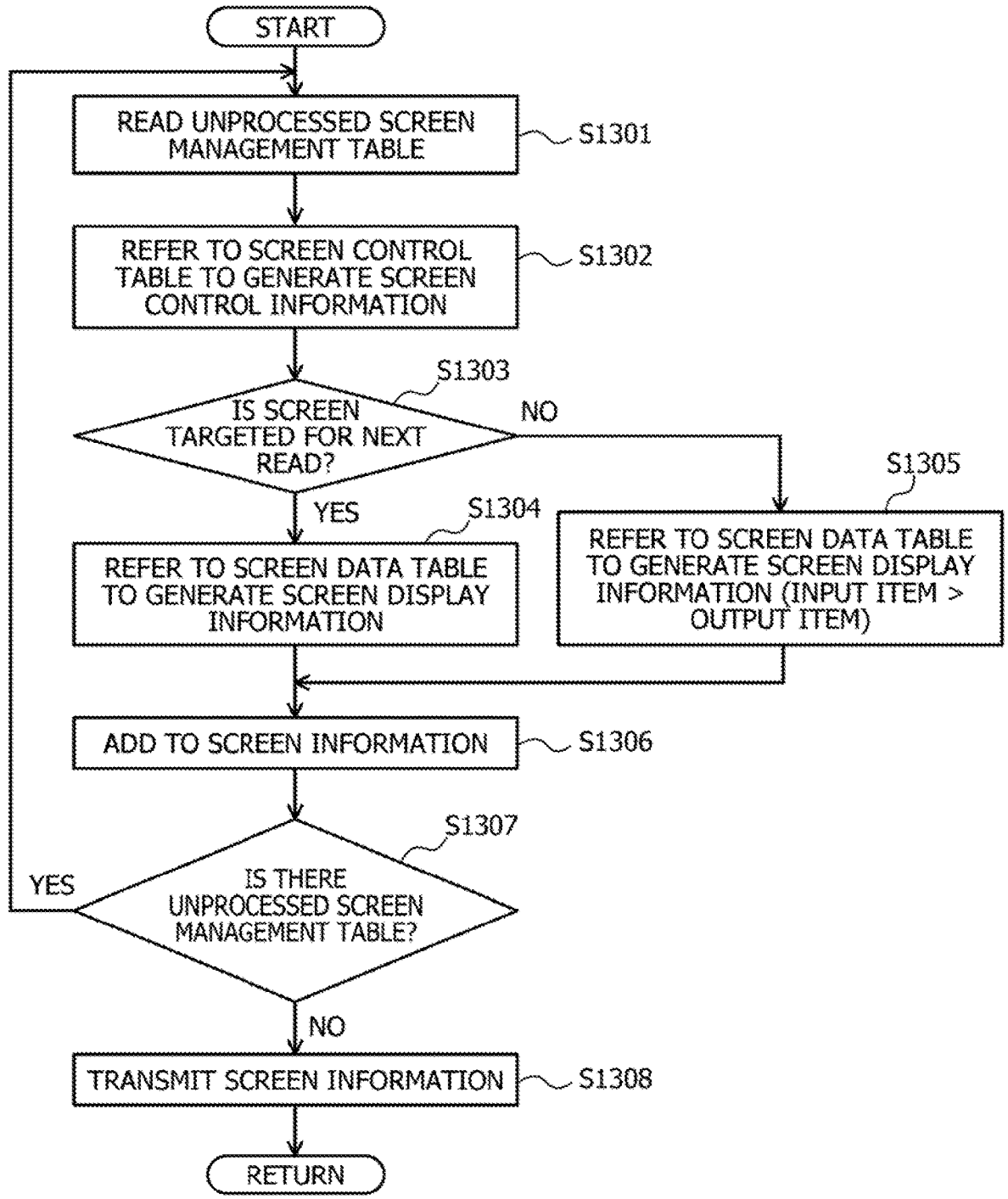
FIG. 13 is a flowchart illustrating an exemplary specific processing procedure in a WRITE process.

FIG. 13 is a flowchart illustrating an exemplary specific processing procedure in the WRITE process. In the flowchart in FIG. 13, first, the server 201 reads the unprocessed screen management table TB from the screen management DB 220 (step S1301).

Next, the server 201 refers to the screen control table 520 of the read screen management table TB to generate the screen control information using HTML and JavaScript (step S1302). The screen control information is information associated with screen control, and indicates, for example, the display position of the screen, the overlap between the screens, and the maximization state of the screen.

Next, the server 201 determines whether or not a screen relevant to the read screen management table TB is targeted for next READ (input target screen) (step S1303). Note that the information that specifies the input target screen is included in the WRITE command from the app APL, for example. Here, when the screen is targeted for next READ (step S1303: Yes), the server 201 refers to the screen data table 510 of the screen management table TB to generate the screen display information using HTML and JavaScript (step S1304), and proceeds to step S1306. The screen display information is information associated with contents of the screen to be displayed.

On the other hand, when the screen is not targeted for next READ (step S1303: No), the server 201 refers to the screen data table 510 of the screen management table TB to generate the screen display information in which the input item has been converted into the output item, using HTML and JavaScript (step S1305).

Then, the server 201 adds the generated screen control information and screen display information to the screen information (drawing data to be drawn by the browser br) (step S1306). Next, the server 201 determines whether or not the screen management DB 220 contains an unprocessed screen management table TB (step S1307).

Here, when an unprocessed screen management table TB is contained (step S1307: Yes), the server 201 returns to step S1301. On the other hand, when no unprocessed screen management table TB is contained (step S1307: No), the server 201 transmits the screen information to the browser br of the terminal device 202 (step S1308), and returns to the step in which the WRITE process was called.

Consequently, a plurality of screens may be drawn in the browser br with one WRITE command from the app APL, using the screen management table TB of each screen subjected to OPEN.

Next, the specific processing procedure in the READ process in step S1106 illustrated in FIG. 11 will be described with reference to FIG. 14.

Figure 14:
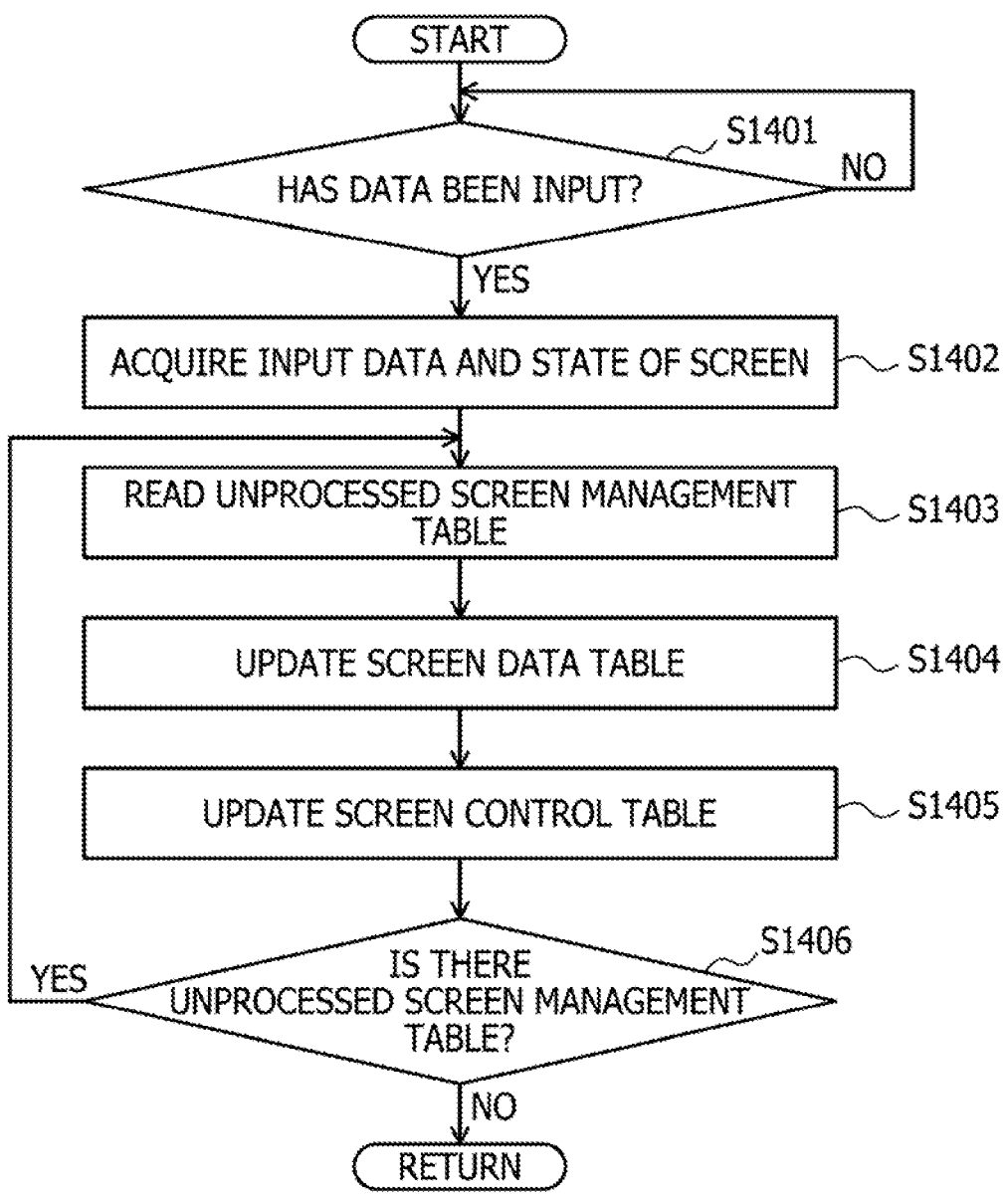
FIG. 14 is a flowchart illustrating an exemplary specific processing procedure in a READ process.

FIG. 14 is a flowchart illustrating an exemplary specific processing procedure in the READ process. In the flowchart in FIG. 14, first, the server 201 determines whether or not data has been input to a screen targeted for READ (step S1401). Here, the server 201 waits for data input to the screen targeted for READ (step S1401: No).

Then, when data has been input to the screen targeted for READ (step S1401: Yes), the server 201 acquires the data input to the screen targeted for READ and information that specifies the state of the screen subjected to OPEN (step S1402).

Next, the server 201 reads the unprocessed screen management table TB from the screen management DB 220 (step S1403). Then, the server 201 refers to the input data to update the screen data table 510 of the read screen management table TB (step S1404).

Next, the server 201 refers to the information that specifies the state of the screen to update the screen control table 520 of the read screen management table TB (step S1405). Then, the server 201 determines whether or not the screen management DB 220 contains an unprocessed screen management table TB (step S1406).

Here, when an unprocessed screen management table TB is contained (step S1406: Yes), the server 201 returns to step S1403. On the other hand, when no unprocessed screen management table TB is contained (step S1406: No), the server 201 returns to the step in which the READ process was called.

Consequently, the screen management table TB of each screen may be updated in response to the input of data to the screen targeted for READ (input target screen).

Next, the specific processing procedure in the CLOSE process in step S1110 illustrated in FIG. 11 will be described with reference to FIG. 15.

Figure 15:
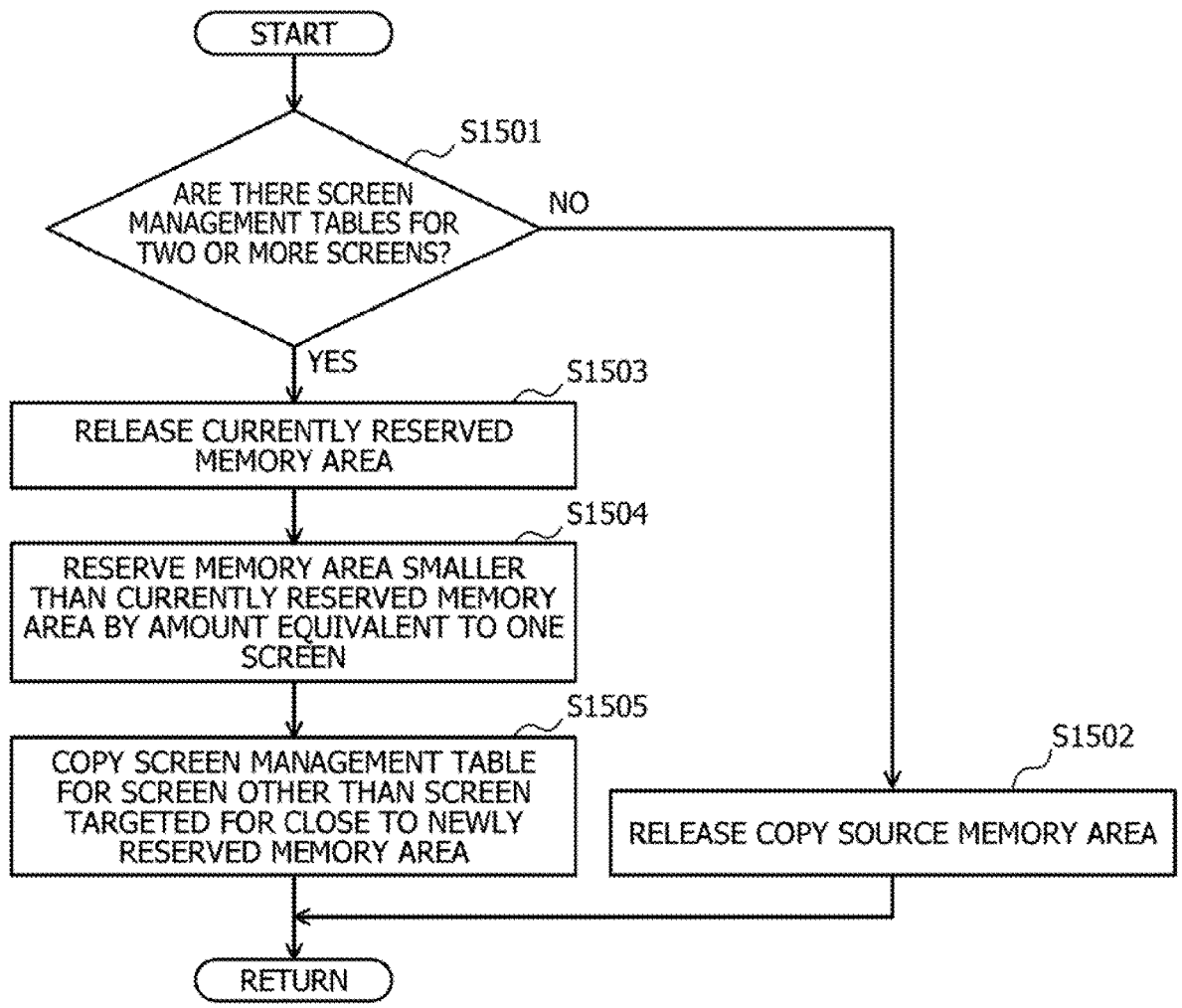
FIG. 15 is a flowchart illustrating an exemplary specific processing procedure in a CLOSE process.

FIG. 15 is a flowchart illustrating an exemplary specific processing procedure in the CLOSE process. In the flowchart in FIG. 15, first, the server 201 determines whether or not the screen management DB 220 contains the screen management tables TB for two or more screens (step S1501).

Here, when the screen management table TB for one screen is contained (step S1501: No), the server 201 releases the currently reserved memory area (step S1502) and returns to the step in which the CLOSE process was called.

On the other hand, when the screen management tables TB for two or more screens are contained (step S1501: Yes), the server 201 reserves a memory area smaller than the currently reserved memory area by an amount equivalent to one screen (step S1503).

Next, the server 201 copies the screen management table TB for a screen other than a screen targeted for CLOSE to the newly reserved memory area (step S1504). Then, the server 201 releases the copy source memory area (step S1505) and returns to the step in which the CLOSE process was called.

Consequently, the screen management table TB of the screen targeted for CLOSE may be deleted from the screen management DB 220 in response to the CLOSE command from the app APL.

As described above, the server 201 (display control device 101) according to the embodiment may create the setting information indicating settings for a new screen and store the created setting information in the storage unit 610, in response to receiving a drawing request to cause the terminal device 202 to draw the new screen from the app APL that controls input and output of a screen by a sequential process that executes a plurality of processes in a predetermined processing order. Then, when only the setting information for the new screen is stored in the storage unit 610, the server 201 (display control device 101) may treat the new screen as the input target screen and transmit, to the terminal device 202, drawing data to draw the new screen, based on the setting information for the new screen. Furthermore, when the setting information for each of a plurality of screens is stored in the storage unit 610, the server 201 (display control device 101) may treat only a new screen among the plurality of screens as the input target screen and transmit, to the terminal device 202, drawing data to draw the plurality of screens collectively, based on the setting information for each of the plurality of screens.

Consequently, even when a plurality of screens is subjected to OPEN (launched), the plurality of screens may be drawn in the browser br with one WRITE command from the app APL, using the setting information (screen management table TB) of each screen subjected to OPEN. In addition, since it is allowed to control the setting of the screen targeted for input, the output of a plurality of screens may be implemented on one communication path between the app APL and the browser br.

Moreover, the server 201 (display control device 101) may acquire data input to the input target screen drawn on the terminal device 202, and update the setting information stored in the storage unit 610 based on the acquired data.

Consequently, information (input and output items) that constitutes contents displayed on each screen may be updated in response to the input of data to the screen targeted for READ (input target screen).

Furthermore, the server 201 (display control device 101) may further acquire information that specifies the state of the screen drawn on the terminal device 202, and update the setting information stored in the storage unit 610 based on the acquired data and the information that specifies the state of the screen.

Consequently, information (the screen position and the maximization state) that controls the layout of each screen may be updated in response to the input of data to the screen targeted for READ (input target screen).

In addition, when the setting information for each of a plurality of screens stored in the storage unit 610 has been updated, in response to receiving, from the app APL, a drawing request to cause the terminal device 202 to draw a screen, the server 201 (display control device 101) may specify a screen targeted for input from among a plurality of screens, and treat only the specified screen as the input target screen to transmit, to the terminal device 202, drawing data to draw the plurality of screens collectively, based on the updated setting information for each of the plurality of screens.

Consequently, a plurality of screens reflecting data input to the screen targeted for READ (input target screen) and the updated contents of each screen based on state changes in the screens being subjected to OPEN may be drawn in the browser br.

Moreover, when receiving, from the app APL, a drawing end request to end the drawing of any screen drawn on the terminal device 202, the server 201 (display control device 101) may delete the setting information for the any screen stored in the storage unit 610.

Consequently, the setting information (screen management table TB) of the screen targeted for CLOSE may be deleted in response to the CLOSE command from the app APL.

Furthermore, when the setting information for any screen among multiple pieces of setting information for a plurality of screens stored in the storage unit 610 has been deleted, in response to receiving, from the app APL, a drawing request to cause the terminal device 202 to draw a screen, the server 201 (display control device 101) may specify a screen targeted for input from among screens other than the any screen, and treat only the specified screen as the input target screen to transmit, to the terminal device 202, drawing data to draw the screens other than the any screen collectively, based on the setting information for each of the screens other than the any screen among the plurality of screens.

Consequently, the remaining screens other than the screen targeted for CLOSE may be drawn in the browser br.

With these functions described above, the server 201 (display control device 101) is allowed to control input and output of a plurality of screens by the runtime system RS without modifying the existing app APL (for example, a legacy asset in the RW style). In addition, since the display does not depend on the client environment, the control of a plurality of screens in legacy assets in the RW style may be implemented in a multi-device environment. Furthermore, when some kind of abnormality occurs, all the screens may be closed at once, such that forgetting to close the screens may be suppressed.

Note that the display control method described in the present embodiments may be implemented by a computer such as a personal computer or a workstation executing a prepared program. This display control program is recorded on a computer-readable recording medium such as a hard disk, flexible disk, compact disk read only memory (CD-ROM), digital versatile disc (DVD), or USB memory, and is read from the recording medium to be executed by the computer. Furthermore, this display control program may be distributed via a network such as the Internet.

Furthermore, the display control device 101 described in the present embodiments may also be implemented by a special-purpose integrated circuit (IC) such as a standard cell or a structured application specific integrated circuit (ASIC) or a programmable logic device (PLD) such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:

creating first setting information that indicates settings for a first screen and storing the created first setting information in a memory, in response to a first drawing request to draw the first screen on a terminal device, the first drawing request having been received from an application that controls input and output of a screen by a sequential process that executes a plurality of processes in a predetermined processing order, the first setting information being setting information that includes first input information relating to an input item included in the first screen and first output information relating to an output item included in the first screen;

generating first drawing data to draw the first screen based on the first setting information;

transmitting the first drawing data to draw the first screen to the terminal device;

creating second setting information that indicates settings for a second screen and storing the created second setting information in the memory, when a second drawing request to cause the terminal device to draw the second screen is received from the application while the first screen is displayed on the terminal device, the second setting information being setting information that includes second input information relating to an input item included in the second screen and second output information relating to an output item included in the second screen;

specifying, according to the second drawing request, the second screen among the first screen and the second screen as an input target screen that is input drawing data;

deactivating the first input information included in the first setting information, according to the specifying of the second screen;

generating the drawing data to draw both of the first screen and the second screen collectively, the drawing data including data that is input through the input target screen and further including the first drawing data and the second drawing data, the first drawing data included in the generated drawing data being drawing data that is generated based on the first setting information after the deactivating the first input information, the second drawing data being drawing data that is generated based on the second setting information to draw the second screen; and transmitting, to the terminal device, the generated drawing data.

2. The non-transitory computer-readable storage medium according to claim 1, wherein the specifying includes:

specifying the second drawing request according to a first timing that the first drawing request is received and a second timing that the second drawing request is received, and specifying, according to the specified second drawing request, the second screen among the first screen and the second screen as an input target screen that is input drawing data.

3. A non-transitory computer-readable storage medium storing a program that causes a computer to execute a process, the process comprising:

creating first setting information that indicates settings for a new screen and storing the created first setting information in a memory, in response to receiving a drawing request to cause a terminal device to draw the new screen, from an application that controls input and output of a screen by a sequential process that executes a plurality of processes in a predetermined processing order, the first setting information being setting information that includes first input information relating to an input item included in the new screen and first output information relating to an output item included in the new screen;

specifying the new screen as an input target screen that is input first drawing data, generating the first drawing data to draw the new screen based on the first setting information for the new screen, and transmitting the first drawing data to the terminal device, when only the setting information for the new screen is stored in the memory;

specifying the new screen among a plurality of screens as the input target screen that is input second drawing data, generating the second drawing data to draw the plurality of screens collectively based on a plurality of setting information including the first setting information, and transmitting the second drawing data to the terminal device, when the plurality of setting information are stored in the memory, each of the plurality of setting information being setting information for each of the plurality of screens; and deactivating the first input information included in the first setting information when a second new screen is specified.

4. The non-transitory computer-readable storage medium according to claim 3, wherein the process further comprises:

acquiring data input to the input target screen drawn on the terminal device; and updating the first setting information stored in the memory, based on the acquired data.

5. The non-transitory computer-readable storage medium according to claim 4, wherein the acquiring includes acquiring information that specifies a state of a screen drawn on the terminal device, and the updating includes updating the first setting information stored in the memory, based on the acquired data and the information that specifies the state of the screen.

6. The non-transitory computer-readable storage medium according to claim 5, wherein the process further comprises deleting second setting information for any one screen drawn on the terminal device, the second setting information being stored in the memory, when a drawing end request to end drawing of the any one screen is received from the application.

7. The non-transitory computer-readable storage medium according to claim 3, wherein
setting information for a screen included in the plurality of setting information is generated according to a drawing request corresponding to a screen, the screen being included in the a plurality of screens.

8. A display control method executed by a computer, the display control method comprising:
creating first setting information that indicates settings for a first screen and storing the created first setting information in a memory, in response to a first drawing request to draw the first screen on a terminal device, the first drawing request having been received from an application that controls input and output of a screen by a sequential process that executes a plurality of processes in a predetermined processing order, the first setting information being setting information that includes first input information relating to an input item included in the first screen and first output information relating to an output item included in the first screen;
generating first drawing data to draw the first screen based on the first setting information;
transmitting the first drawing data to draw the first screen to the terminal device;
creating second setting information that indicates settings for a second screen and storing the created second setting information in the memory, when a second drawing request to cause the terminal device to draw the second screen is received from the application while the first screen is displayed on the terminal device, the second setting information being setting information that includes second input information relating to an input item included in the second screen and second output information relating to an output item included in the second screen;
specifying, according to the second drawing request, the second screen among the first screen and the second screen as an input target screen that is input drawing data;
deactivating the first input information included in the first setting information, according to the specifying of the second screen;
generating the drawing data to draw both of the first screen and the second screen collectively, the drawing data including data that is input through the input target screen and further including the first drawing data and the second drawing data, the first drawing data included in the generated drawing data being drawing data that is generated based on the first setting information after the deactivating the first input information, the second drawing data being drawing data that is generated based on the second setting information to draw the second screen; and
transmitting, to the terminal device, the generated drawing data.

9. A display control method executed by a computer, the display control method comprising:
creating first setting information that indicates settings for a new screen and storing the created first setting information in a memory, in response to receiving a drawing request to cause a terminal device to draw the new screen, from an application that controls input and output of a screen by a sequential process that executes a plurality of processes in a predetermined processing order, the first setting information being setting information that includes first input information relating to an input item included in the new screen and first output information relating to an output item included in the new screen;
specifying the new screen as an input target screen that is input first drawing data, generating the first drawing data to draw the new screen based on the first setting information for the new screen, and transmitting the first drawing data to draw the new screen to the terminal device, when only the setting information for the new screen is stored in the memory;
specifying the new screen among a plurality of screens as the input target screen that is input second drawing data, generating the second drawing data to draw the plurality of screens collectively based on a plurality of setting information including the first setting information, and transmitting the second drawing data to the terminal device, based on setting information for each of the plurality of screens, when the plurality of setting information are stored in the memory, each of the plurality of setting information being setting information for each of the plurality of screens; and
deactivating the first input information included in the first setting information when a second new screen is specified.

10. A display control device, comprising:
a memory; and
a processor coupled to the memory and configured to:
create first setting information that indicates settings for a first screen and storing the created first setting information in a memory, in response to a first drawing request to draw the first screen on a terminal device, the first drawing request having been received from an application that controls input and output of a screen by a sequential process that executes a plurality of processes in a predetermined processing order, the first setting information being setting information that includes first input information relating to an input item included in the first screen and first output information relating to an output item included in the first screen;
generate first drawing data to draw the first screen based on the first setting information;
transmit the first drawing data to draw the first screen to the terminal device;
create second setting information that indicates settings for a second screen and storing the created second setting information in the memory, when a second drawing request to cause the terminal device to draw the second screen is received from the application while the first screen is displayed on the terminal device, the second setting information being setting information that includes second input information relating to an input item included in the second screen and second output information relating to an output item included in the second screen;
specify, according to the second drawing request, the second screen among the first screen and the second screen as an input target screen that is input drawing data;
deactivate the first input information included in the first setting information, according to the specifying of the second screen;
generate the drawing data to draw both of the first screen and the second screen collectively, the drawing data including data that is input through the input target screen and further including the first drawing data and the second drawing data, the first drawing data included in the generated drawing data being drawing data that is generated based on the first setting information after the deactivating the first input information, the second drawing data being drawing data that is generated based on the second setting information to draw the second screen; and transmit, to the terminal device, the generated drawing data.

11. A display control device, comprising:

a memory; and a processor coupled to the memory and configured to:

create first setting information that indicates settings for a new screen and storing the created first setting information in a memory, in response to receiving a drawing request to cause a terminal device to draw the new screen, from an application that controls input and output of a screen by a sequential process that executes a plurality of processes in a predetermined processing order, the first setting information being setting information that includes first input information relating to an input item included in the new screen and first output information relating to an output item included in the new screen, specify the new screen as an input target screen that is input first drawing data, generate the first drawing data to draw the new screen based on the first setting information for the new screen, and transmit the first drawing data to the terminal device, when only the setting information for the new screen is stored in the memory, specify the new screen among a plurality of screens as the input target screen that is input second drawing data, generate the second drawing data to draw the plurality of screens collectively based on a plurality of setting information including the first setting information, and transmit the second drawing data to the terminal device, when the plurality of setting information are stored in the memory, each of the plurality of setting information being setting information for each of the plurality of screens, and deactivate the first input information included in the first setting information when a second new screen is specified.

* * * * *